United States Patent
Jung et al.

(10) Patent No.: US 10,054,986 B2
(45) Date of Patent: Aug. 21, 2018

(54) ELECTRONIC DEVICE WITH LARGE CAPACITY BATTERY

(71) Applicant: Samsung Electronics Co., Ltd., Suwon-si, Gyeonggi-do (KR)

(72) Inventors: Min Su Jung, Seoul (KR); Yong Seok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/286,914

(22) Filed: Oct. 6, 2016

(65) Prior Publication Data

US 2017/0235340 A1    Aug. 17, 2017

Related U.S. Application Data

(60) Provisional application No. 62/245,238, filed on Oct. 22, 2015.

(30) Foreign Application Priority Data

Nov. 3, 2015   (KR) .................. 10-2015-0153731

(51) Int. Cl.
  *H05K 7/00*   (2006.01)
  *G06F 1/16*   (2006.01)

(52) U.S. Cl.
  CPC ............ *G06F 1/1635* (2013.01); *G06F 1/166* (2013.01); *G06F 1/1626* (2013.01)

(58) Field of Classification Search
  CPC ......................................................... G06F 1/16
  USPC ..................................................... 361/679.01
  See application file for complete search history.

(56) References Cited

U.S. PATENT DOCUMENTS

| | | | |
|---|---|---|---|
| 5,604,050 A * | 2/1997 | Brunette | H01M 2/1022 254/2 R |
| 8,888,063 B2 | 11/2014 | Mack et al. | |
| 9,195,263 B2 | 11/2015 | Mack et al. | |
| 9,225,112 B2 * | 12/2015 | Lee | H01R 13/6275 |
| 9,331,444 B2 | 5/2016 | Carnevali | |
| 2013/0163197 A1 | 6/2013 | Mack et al. | |
| 2015/0028185 A1 | 1/2015 | Mack et al. | |
| 2015/0241935 A1 | 8/2015 | Jang et al. | |
| 2015/0244126 A1 | 8/2015 | Carnevali | |

FOREIGN PATENT DOCUMENTS

JP        2015070366 A      4/2015

* cited by examiner

*Primary Examiner* — Jerry Wu
(74) *Attorney, Agent, or Firm* — Jefferson IP Law, LLP

(57) ABSTRACT

An electronic device is provided. The electronic device includes a housing having a first surface, and a second surface. The second surface includes a first part and a second part that protrudes further than the first part, and a side member configured to be a part of the second surface or formed separately and surround a space between the first surface and the second surface. The electronic device includes a display, a wireless communication circuit, a memory, a processor and electrically connected to one of the display, the wireless communication circuit, and the memory, and a battery configured to supply power to at least one of the display, the wireless communication circuit, the memory, and the processor. A part of the battery is disposed in a partial space between the second part of the second surface and the first surface.

9 Claims, 28 Drawing Sheets

ELECTRONIC DEVICE WITH LARGE CAPACITY BATTERY

CROSS-REFERENCE TO RELATED APPLICATION(S)

This application claims the benefit under 35 U.S.C. § 119(e) of a U.S. Provisional application filed on Oct. 22, 2015 in the U.S. Patent and Trademark Office and assigned Ser. No. 62/245,238, and under 35 U.S.C. § 119(a) of a Korean patent application filed on Nov. 3, 2015 in the Korean Intellectual Property Office and assigned Ser. No. 10-2015-0153731, the entire disclosure of each of which is hereby incorporated by reference.

TECHNICAL FIELD

The present disclosure relates to an electronic device with a large capacity battery.

BACKGROUND

A battery for supplying power may be fastened to an electronic device such as a smartphone, a tablet personal computer (PC), or a laptop PC. In the case of an electronic device with a large-sized display, a large capacity battery may be used to obtain an optimal usage time. A battery may be provided in various types. For example, a battery may be provided in a coin type/shape, a cylindrical type/shape, or a rectangular type/shape.

In the case of a thin type (or slim type) battery, it is difficult to manufacture a large capacity battery due to the related cost increase. Accordingly, in the case of an electronic device that requires a large capacity battery, a relatively large volume of a cylindrical or thick rectangular battery may be used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device in which a part of a housing protrudes and a battery is disposed at the inner side of a protruding area.

Another aspect of the present disclosure is to provide a cradle detachable from a part of a protruding area of a housing and for performing a hinge operation by using the protruding area as a rotation axis.

In accordance with an aspect of the present disclosure, an electronic device is provided. The electronic device includes a housing comprising a first surface configured to face a first direction, a second surface configured to face a second direction opposite to the first direction substantially, wherein the second surface comprises a first part and a second part that protrudes further than the first part, and a side member configured to be a part of the second surface or formed separately and surround a space between the first surface and the second surface, wherein at least one of the first surface and the second surface is formed in a rectangular form substantially, a display configured to be exposed through at least a part of the first surface, a wireless communication circuit disposed at the inner side of the housing, a memory disposed at the inner side of the housing, a processor disposed at the inner side of the housing and electrically connected to at least one of the display, the wireless communication circuit, and the memory, and a battery configured to supply power to at least one of the display, the wireless communication circuit, the memory, and the processor, wherein at least a part of the battery is disposed in at least a partial space between the second part of the second surface and the first surface.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
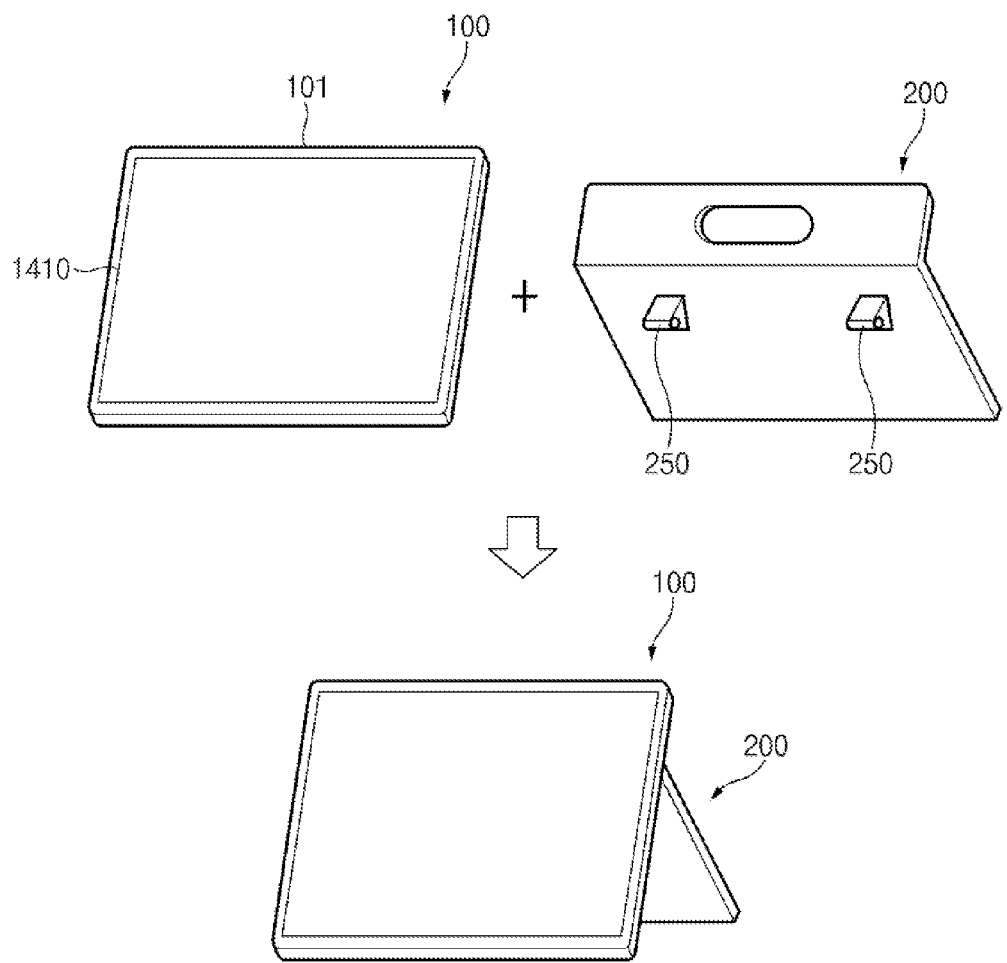
FIG. 1 is a perspective view of an electronic device and a cradle according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group phase 1 or phase 2 (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a perspective view of an electronic device and a cradle according to an embodiment of the present disclosure.

Referring to FIG. 1, an electronic device 100 may include a housing 101 and a display 1410 disposed at one surface of the housing 101. The housing 101 may form the appearance of the electronic device 100 and at least one surface of the housing 101 may be provided in a polygonal form. For example, at least one surface of the housing 101 may be formed in a rectangular form. Additionally, a plurality of surfaces of the housing 101 may be formed in a rectangular form, so that the housing 101 may be substantially formed of a rectangular parallelepiped. According to various embodiments of the present disclosure, at least one surface of the housing 101 may be formed in a circular form, an elliptical form, or a free curved form. According to various embodiments of the present disclosure, at least one surface of the housing 101 may be bent with a predetermined size of curvature on at least one side part and connected to the other surface. According to various embodiments of the present disclosure, although not shown in the drawing, the housing 101 may be provided in a form that at least a part protrudes. For example, the housing 101 may include a front surface, a rear surface that is substantially in an opposite direction to the front surface, and a side surface that surrounds a space between the front surface and the rear surface, and at least a part of the rear surface may protrude from one side of the rear surface.

As a part of the rear surface protrudes, a cavity may be formed at the inner side of the protruding part. According to an embodiment of the present disclosure, a battery for supplying power to the electronic device 100 may be disposed at the inner side of the protruding part of the housing 101. According to some embodiments of the present disclosure, a component (for example, a speaker) that occupies a relatively large volume may be additionally disposed at the cavity.

The display 1410 may present various content (e.g., a text, an image, a video, an icon, a symbol, or the like) to the user. The display 1410 may include a touch screen, and may receive a touch, gesture, proximity or hovering input from an electronic pen or a part of a body of the user.

The cradle 200 may be coupled to the electronic device 100 and mount (or cradle) the electronic device 100 with at least one specified (or selected) angle (or inclination). According to an embodiment of the present disclosure, the cradle 200 may be provided in a formed of being detachable from the electronic device 100. For example, the cradle 200 may include a coupling part 250 detachably fastened to one part of the housing 101 of the electronic device 100. According to some embodiments of the present disclosure, the cradle 200 may be provided in an integrated form coupled to a protruding area of the housing 101 of the electronic device 100, and may mount the electronic device 100 at various angles.

Through various embodiments described later, the type of the battery, the forms of the electronic device 100 and the cradle 200, a fastening structure, and a cradling form will be described in greater detail.

Figure 2A:
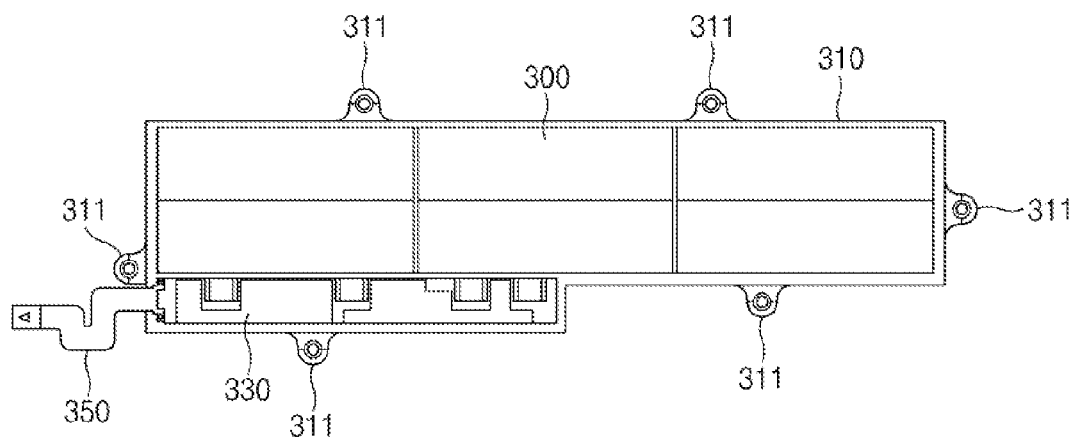
FIG. 2A is a front view illustrating a battery disposed at the inner side of an electronic device and components relating to the fastening of the battery according to an embodiment of the present disclosure.
Figure 2B:
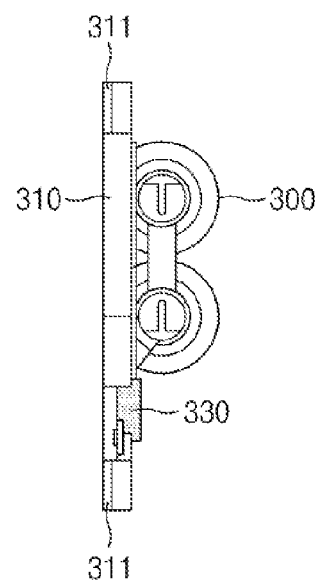
FIG. 2B is a side view illustrating a battery and components relating to the coupling of the battery according to an embodiment of the present disclosure.

FIG. 2A is a front view illustrating a battery disposed at the inner side of an electronic device and components relating to the fastening of the battery according to an embodiment of the present disclosure and FIG. 2B is a side view illustrating a battery and components relating to the coupling of the battery according to an embodiment of the present disclosure.

According to various embodiments of the present disclosure, an electronic device 100 may include a battery 300 for supplying power to the electronic device 100 at the inner side of the housing 101. The battery 300 may include at least one battery cell, and the battery cell (or cells) may be provided in various types. According to an embodiment of the present disclosure, the battery cell may be provided in a cylindrical type or a rectangular parallelepiped type having a large capacity and a relatively large volume.

Referring to FIGS. 2A and 2B, at least one battery 300 may be disposed at the inner side of the housing 101. The battery 300 may be fastened to a battery frame 310 fixed by at least one frame fixing part 311 at the inner side of the housing 101. The drawing shown illustrates a state in which battery cells of a cylindrical type are fastened to the battery frame 310 in two rows and three columns. According to an embodiment of the present disclosure, the battery cells are fastened to the battery frame 310, and may be electronically connected to an electrical connection part 330 disposed at the battery frame 310. The battery cells may be fixed not to be escaped to the outside as being covered by one surface (for example, the rear surface) of the housing 101. According to an embodiment of the present disclosure, a battery cover may be further provided. The battery cover may be coupled to at least one side of the battery frame 310 in a form of covering the battery cells so as to fix the battery cells. Additionally, the battery cells may supply power to the electronic device 100 through a power supply unit 350 connected to the electrical connection part 330. According to various embodiments of the present disclosure, the electrical connection part 330 may include a battery protection circuit.

As shown in FIG. 2B, a space between the front surface and the rear surface of the housing 101 is obtained with a predetermined thickness to cover the battery 300 due to a form of the battery cells, the entire volume of the electronic device 100 is increased, so that mobility and portability may drop and manufacturing cost may be increased. Accordingly, as providing only a part of the rear surface of the housing 101 in a protruding form, the electronic device 100 may have an entirely slim form and also stably place the battery 300 at the cavity formed at the inner side of the housing 101.

Figure 3A:
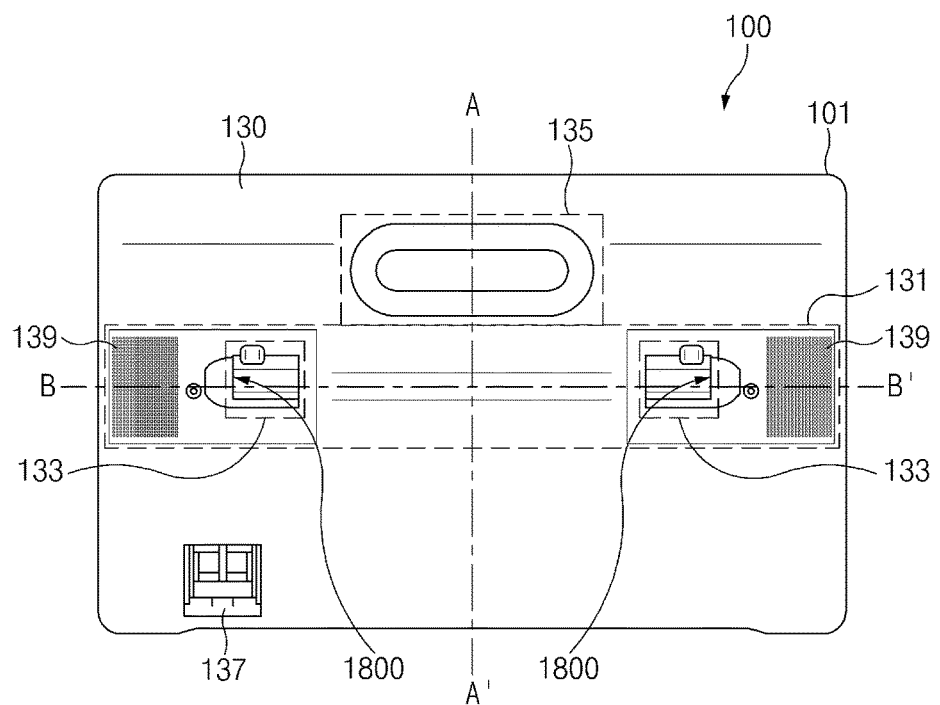
FIG. 3A is a rear view of an electronic device in a form that a part of a housing protrudes according to an embodiment of the present disclosure.
Figure 3B:
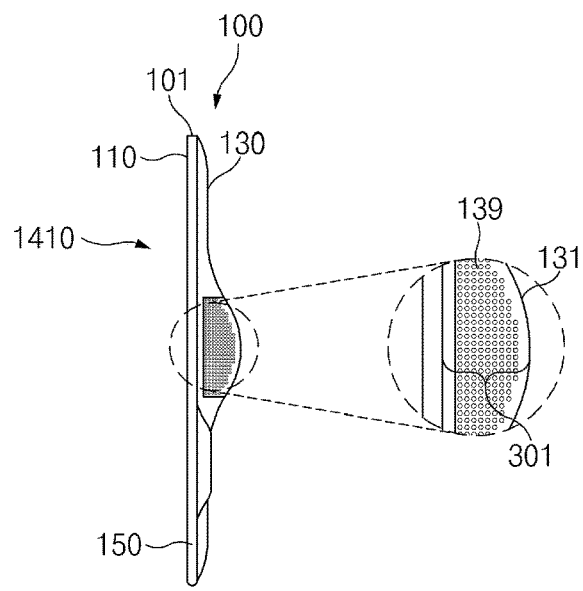
FIG. 3B is a side view of the electronic device of FIG. 3A according to an embodiment of the present disclosure.

FIG. 3A is a rear view of an electronic device in a form that a part of a housing protrudes according to an embodiment of the present disclosure and FIG. 3B is a side view of the electronic device of FIG. 3A according to an embodiment of the present disclosure.

Referring to FIGS. 3A and 3B, the electronic device 100 may include a housing 101 having a front surface 110, a rear surface 130 that substantially faces opposite to the front surface 110, and a side surface 150 that surrounds a space between the front surface 110 and the rear surface 130. The housing 101 may be substantially formed of a rectangular parallelepiped. According to an embodiment of the present disclosure, the front surface 110 of the housing 101 may be formed flat and the display 1410 may be disposed in its partial area.

The rear surface 130 of the housing 101 may include a protruding part 131. For example, the rear surface 130 may include a first part (for example, a peripheral part of the protruding part 131) and a second part (for example, the protruding part 131) that relatively further protrudes than the first part. The protruding part 131 is a protruding area formed at the rear surface 130 of the housing 101, and at least a part may be formed at a specified size of protruding height 301 (for example, a spaced distance from the front surface 110) in a length direction (for example, a direction of a line B-B') of the rear surface 130. As shown in the drawing, the protruding part 131 may be formed in a form of gradually reducing a protruding height in a width direction (for example, a direction of a line A-A') of the rear surface 130 by using the center line (for example, the line B-B') of the protruding part 131 as the maximum height. Additionally, while formed at a specified size of protruding height in the length direction of the rear surface 130, the protruding part 131 may be formed in a form that the protruding height is gradually reduced in a border area in the length direction of the protruding part 131.

According to various embodiments of the present disclosure, the position and form of the protruding part 131 are not limited thereto. For example, the protruding part 131 may be formed at the upper part or lower part of the rear surface 130 of the housing 101. Additionally, the protruding part 131 may be formed in a form that a protruding height is gradually reduced from the center part to a peripheral part or a form having a predetermined protruding height. Additionally, the protruding part 131 may be disposed on at least one position of the upper part, middle part, and lower part of the rear surface 130 of the housing 101.

According to various embodiments of the present disclosure, the protruding part 131 may include at least one recess part 133. The recess part 133 is an area recessed with a specified width and height at a part of the protruding part 131, and the drawing shown illustrates that each one is formed in an area adjacent to the border in the length direction of the protruding part 131. According to various embodiments of the present disclosure, the recess part 133 may include a fastening part 1800 (for example, a fastening hole) at one side (for example, at least one part of the sidewall), and when the cradle 200 is inserted into the recess part 133, the cradle 200 (shown in FIG. 1, for example) may be fastened to the fastening part 1800.

According to various embodiments of the present disclosure, the position and form of the recess part 133 are not limited thereto. For example, the recess part 133 may be formed in the center area of the protruding part 131. According to various embodiments of the present disclosure, the recess part 133 may be formed in an area adjacent to the protruding part 131 instead of any one area of the protruding part 131. In this case, the recess part 133 may be recessed and formed with a relatively small size of depth than when formed in an area of the protruding part 131.

According to various embodiments of the present disclosure, a cutout part 135 cut out with a specified width and depth may be formed in one area (for example, an upper end center area) of the rear surface 130 of the housing 101. As the cutout part 135 is formed in a form (for example, an engraved form) recessed in the direction from one side of the rear surface 130 of the housing 101 to the front surface 110, when a user grips the electronic device 100, a finger is caught by the sidewall of the cutout part 135 to allow the user to grip the electronic device 100 easily. For example, the cutout part 135 may be utilized as a handle space of the electronic device 100.

According to various embodiments of the present disclosure, a module 137 into which a card type device (for example, a subscriber identification module (SIM) card) is insertable may be further formed in one area (for example, a lower end left area) of the rear surface 130 of the housing 101. For example, the card type device is coupled to the rear surface 130 of the housing 101 in a slide manner, so that the module 137 electrically connected to the electronic device 100 may be formed.

According to various embodiments of the present disclosure, at least one hole 139 may be formed at the border in the length direction of the protruding part 131. For example, at least one hole 139 may be formed in an area where the protruding height of the protruding part 131 is gradually reduced in a border area in the length direction of the protruding part 131. According to an embodiment of the present disclosure, at least one hole 139 formed at the rear surface 130 may be used as a speaker hole through which sound is outputted to the outside from a speaker disposed at the inner side of the electronic device 100.

Figure 4A:
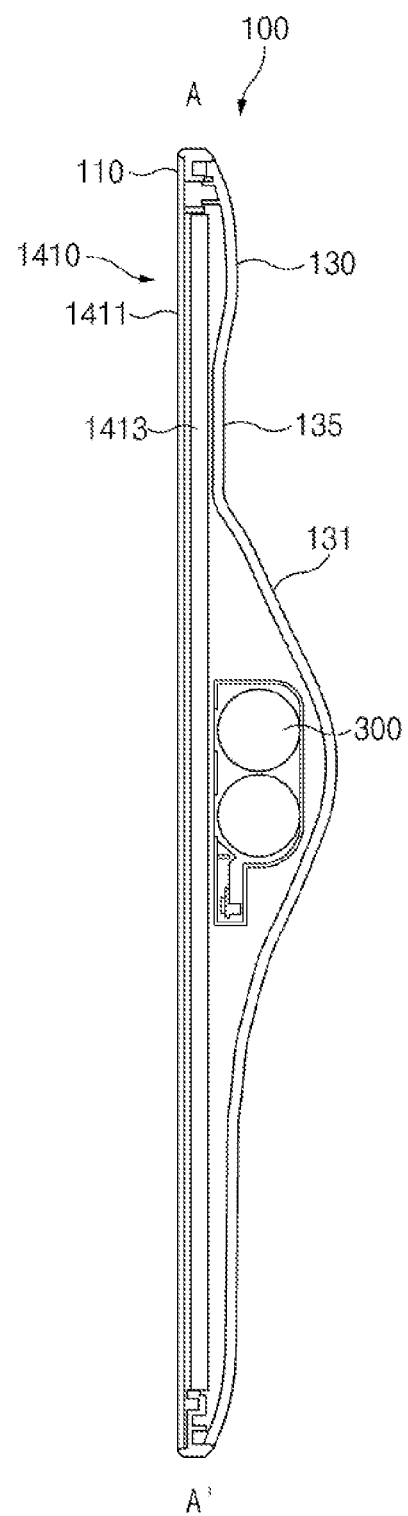
FIG. 4A is a sectional view taken along a line A-A' of FIG. 3A according to an embodiment of the present disclosure.

FIG. 4A is a sectional view taken along a line A-A' of FIG. 3A according to an embodiment of the present disclosure.

Referring to FIG. 4A, the display 1410 may be disposed in a partial area of the front surface 110 of the electronic device 100. For example, in relation to the electronic device 100, a display panel 1413 may be disposed at the inner side of a partial area of the front surface 110 of the housing 101, and a display window 1411 may be disposed at the outer side where the display panel 1413 is disposed.

The display 1410 may include, for example, a liquid crystal display (LCD), a light-emitting diode (LED) display, an organic LED (OLED) display, plastic OLED (POLED) display, a microelectromechanical systems (MEMS) display, or an electronic paper display. For example, the display panel 1413 may be flexible, transparent, or wearable. The display panel 1413 and a touch panel may be integrated into a single module. The touch panel, for example, may receive a touch, a gesture, a proximity, or a hovering input with a touch object (for example, a user's finger) through at least one of a capacitive, resistive, infrared, or ultrasonic method. The display window 1411 may form the appearance of the front surface 110 of the housing 101, and include a transparent material to display various contents outputted through the display panel 1413 to the outside.

The protruding part 131 may be formed in a partial area of the rear surface 130 of the housing 101 of the electronic device 100. The drawing shown illustrates a state in which the protruding part 131 is formed in the center area of the rear surface 130. According to various embodiments of the present disclosure, the battery 300 may be disposed at a cavity formed at the inner side of the protruding part 131. The battery 300 may supply power to the electronic device 100 and may be provided in various forms. The drawing shown illustrates a state in which the battery 300 is provided in a cylindrical type.

According to various embodiments of the present disclosure, the cutout part 135 may be formed in a partial area of the rear surface 130 of the housing 101. The cutout part 135, for example, as an area utilized as a handling space of the electronic device 100, may be formed in a form of being recessed in the direction from one side of the rear surface 130 of the housing 101 to the front surface 110. The drawing shown illustrates a state in which the cutout part 135 is formed at the upper end of the protruding part 131.

Figure 4B:
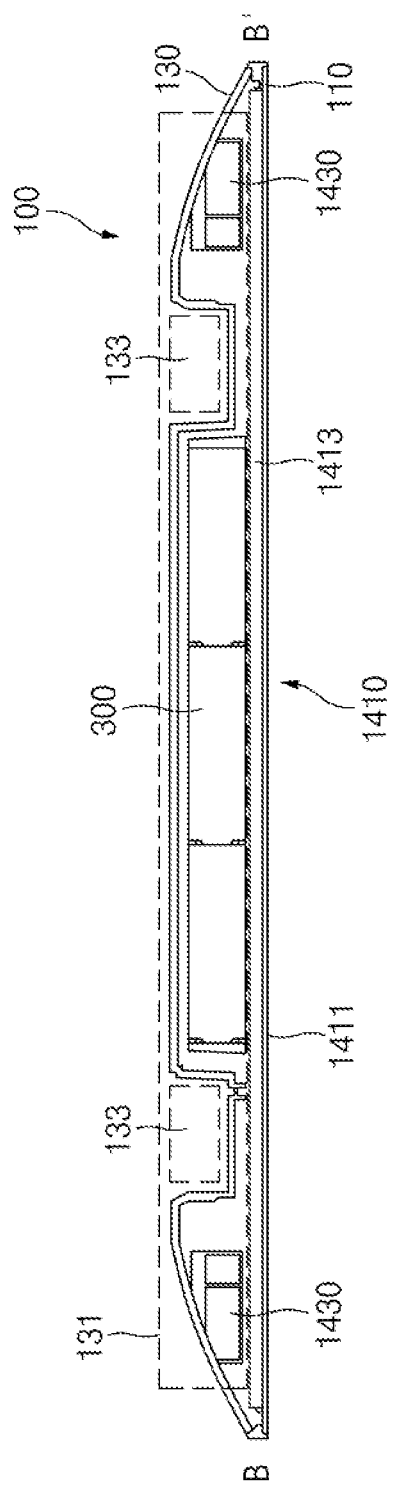
FIG. 4B is a sectional view taken along a line B-B' of FIG. 3A according to an embodiment of the present disclosure.

FIG. 4B is a sectional view taken along a line B-B' of FIG. 3A according to an embodiment of the present disclosure.

Referring to FIG. 4B, at least one recess part 133 recessed with a specified width and depth may be formed in a partial area of the protruding part 131 formed at the rear surface 130 of the housing 101 of the electronic device 100. The drawing shown illustrates a state in which each one recess part 133 is formed in a vertical direction of the battery 300 adjacent to an area where the battery 300 is disposed. According to various embodiments of the present disclosure, a fastening part may be further formed at a part of the sidewall of the recess part 133, and when the coupling part 250 of the cradle 200 (shown in FIG. 1, for example) is inserted into the recess part 133, the coupling part 250 may be fastened to the fastening part.

According to various embodiments of the present disclosure, a relatively large volume of component in addition to the battery 300 may be further disposed at the inner side of the protruding part 131. According to an embodiment of the present disclosure, at least one speaker 1430 may be disposed at the inner side of the protruding part 131. As shown in the drawing, each one speaker 1430 may be disposed at both the borer inner sides of the protruding part 131.

According to various embodiments of the present disclosure, while formed at a specified size of protruding height by a specified length in the length direction (for example, a direction of the line B-B') of the rear surface 130 from the center part, the protruding part 131 may be formed in a form that the protruding height is gradually reduced to a peripheral part (or a border) past the recess part 133. According to an embodiment of the present disclosure, the speaker 1430 may be disposed at the border inner side of the protruding part 131 where the protruding height is reduced gradually. Additionally, the border of the protruding part 131 where the protruding height is gradually reduced may include at least one hole 139, and a sound outputted from the speaker 1430 may be emitted to the outside through the at least one hole 139.

Figure 5A:
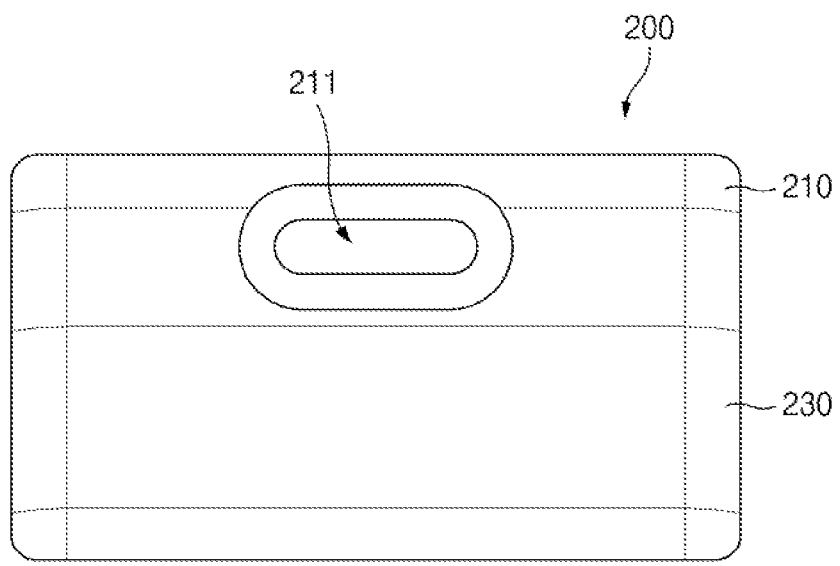
FIG. 5A is a front view of a cradle detachable from an electronic device according to an embodiment of the present disclosure.
Figure 5B:
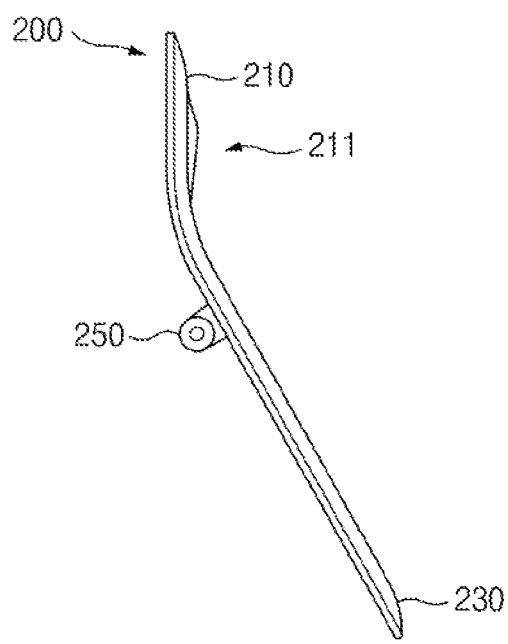
FIG. 5B is a side view of the cradle of FIG. 5A according to an embodiment of the present disclosure.

FIG. 5A is a front view of a cradle detachable from an electronic device according to an embodiment of the present disclosure and FIG. 5B is a side view of the cradle of FIG. 5A according to an embodiment of the present disclosure.

Referring to FIGS. 5A and 5B, a cradle 200 detachable from an electronic device 100 may include a main body including a first support part 210 having a predetermined surface and a second support part 230 formed as extending from one side of the first support part 210, and at least one coupling part 250 formed at a part of the main body to be fastened to the electronic device 100. According to various embodiments of the present disclosure, the first support part 210 and the second support part 230 may form a specified angle (or inclination). For example, the main body of the cradle 200 may be formed in a form that the second support part 230 extending from one side of the first support part 210 is bent with a specified angle at one side of the first support part 210. The drawing shown illustrates a state that the second support part 230 is bent at a specified angle (for example, an acute angle (or, an angle of greater than 0 degree and less than 90 degrees) in the front direction of the cradle 200 from the first support part 210. However, the form of the cradle 200 is not limited thereto. According to various embodiments of the present disclosure, in relation to the cradle 200, the first support part 210 and the second support part 230 may be formed in a straight line form (for example, a connection area of the first support part 210 and the second support part 230 is in a flat form).

According to various embodiments of the present disclosure, an opening part 211 may be formed in a partial area (for example, an upper end center area) of the first support part 210. When the cradle 200 is fastened to the electronic device 100 and the first support part 210 of the cradle 200 closely contacts the rear surface 130 of the housing 101 of the electronic device 100, the opening part 211 may be aligned to the cutout part 135 formed at the rear surface 130 of the housing 101 and closely contact it. According to an embodiment of the present disclosure, the opening part 211 may be formed with the same or similar width to the cutout part 135. Accordingly, when the opening part 211 closely contacts the cutout part 135, due to the depth of the cutout part 135 and the depth of the opening part 211, an area for catching a finger becomes broader, so that it may be easier for a user to grip the electronic device 100.

According to various embodiments of the present disclosure, the main body of the cradle 200 may be formed with the same or similar horizontal length and vertical length to the electronic device 100. However, the main body size of the cradle 200 is not limited thereto. According to an embodiment of the present disclosure, the main body of the cradle 200 may be formed with a horizontal length that is relatively smaller than that of the electronic device 100 or may be formed with a vertical length that is relatively smaller than that of the electronic device 100. Additionally, although it is shown in the drawing that the main body of the cradle 200 is formed of sides, according to an embodiment of the present disclosure, a predetermined form (for example, a cylindrical form) of stick may configure the main body border of the cradle 200, and the main body inside may be provided in an empty state.

According to various embodiments of the present disclosure, the coupling part 250 may be formed in a partial area of the main body of the cradle 200. According to an embodiment of the present disclosure, each one coupling part 250 may be provided at the left and right sides as forming a specified separation distance in the left and right direction (or, the length direction) in the rear surface upper end area of the second support part 230. For example, a plurality of coupling parts 250 may be disposed in the rear surface left upper end area and the rear surface right upper end area of the second support part 230.

According to various embodiments of the present disclosure, the coupling part 250 may be formed to have a specified width and length in the main body rear surface direction of the cradle 200. According to an embodiment of the present disclosure, the width and length of the coupling part 250 may correspond to the width and depth of the recess part 133 formed at the rear surface 130 of the housing 101 of the electronic device 100. For example, the width of the coupling part 250 may be formed with the same or similar size to the width of the recess part 133, and the length of the coupling part 250 may be formed with the same or similar size to the depth of the recess part 133.

According to various embodiments of the present disclosure, one end of the coupling part 250 may be connected to the main body of the cradle 200, and the other end of the coupling part 250 may be fastened to the recess part 133 formed at the electronic device 100. According to various embodiments of the present disclosure, in order to allow the other end of the coupling part 250 fastened to the recess part 133 to be smoothly inserted into the recess part 133, a part of the edge may be formed in a curved form.

According to various embodiments of the present disclosure, the coupling part 250 may be fastened rotatably (or, hingedly) to allow the cradle 200 to change a cradling form of the electronic device 200. According to an embodiment of the present disclosure, the coupling part 250 may include an elastic member (for example, a spring) at the inner side and a center axis (for example, a hinge pin) disposed movably in a specified direction while at least a part protrudes to the outside by the elastic member. According to various embodiments of the present disclosure, the cradle 200 may rotate by using the center axis as a rotation axis when the center axis is fastened to a fastening part formed at the sidewall of the recess part 133. Additionally, when a specified size of force is applied to the elastic member in a specified direction, at least a part of the center axis protruding toward the outside is moved in the inner side direction of the coupling part 250, so that this may separate the cradle 200 from the electronic device 100.

Figure 6A:
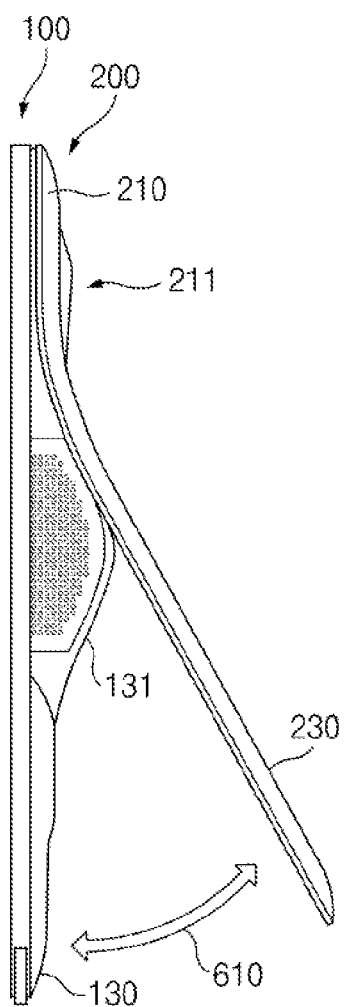
FIG. 6A is a view illustrating a state in which an electronic device and a cradle are fastened to each other according to an embodiment of the present disclosure.
Figure 6A:
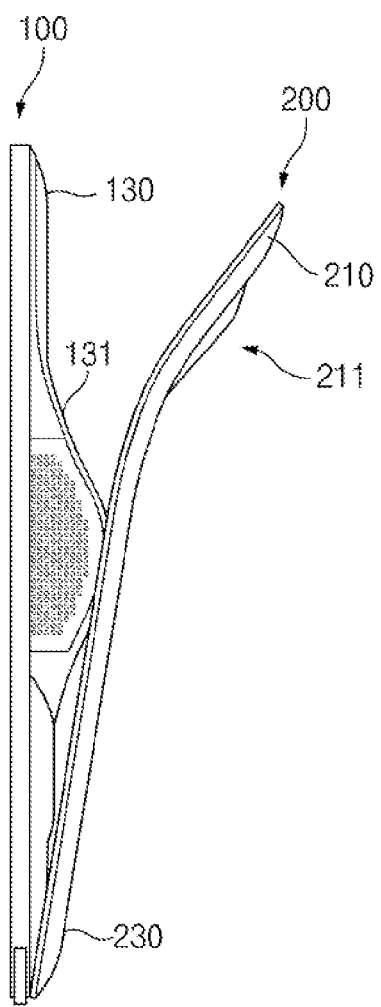

FIG. 6A is a view illustrating a state in which an electronic device and a cradle are fastened to each other according to an embodiment of the present disclosure.

Referring to FIG. 6A, the cradle 200 may be detachable from the electronic device 100. According to an embodiment of the present disclosure, in relation to the cradle 200, the coupling part 250 may be inserted into the recess part 133 formed at the rear surface 130 of the housing 101 of the electronic device 100 and may be fastened to a fastening part disposed at one side of the recess part 133. According to various embodiments of the present disclosure, the cradle 200 may be fastened rotatably (or, hingedly) to the electronic device 200. For example, the cradle 200 may rotate by using a center axis formed at the inner side of the coupling part 250.

According to various embodiments of the present disclosure, as rotating by using the center axis formed at the inner side of the coupling part 250 as a rotation axis, the cradle 200 may form at least one specified angle (or inclination) with the electronic device 100. According to an embodiment of the present disclosure, depending on a rotation angle during a hinge operation 610 of the cradle 200, an angle formed by the first support part 210 or the second support part 230 of the cradle 200 and the rear surface 130 of the housing 101 of the electronic device 100 may vary. For example, as shown in a first state 501, when the first support part 210 of the cradle 200 closely contacts the upper end of the rear surface 130 of the housing 101 of the electronic device 100, the rear surface 130 of the housing 101 of the electronic device 100 may form a specified angle (for example, an acute angle) with the second support part 230 of the cradle 200. Additionally, as shown in a second state 503, when a part of the second support part 230 of the cradle 200 closely contacts the lower end of the rear surface 130 of the housing 101 of the electronic device 100, the rear surface 130 of the housing 101 of the electronic device 100 may form a specified angle (for example, an acute angle) with the first support part 210.

According to various embodiments of the present disclosure, when the cradle 200 is fastened to the electronic device 100, a part of the cradle 200 may support the electronic device 100 as facing the protruding part 131 formed at the rear surface 130 of the housing 101 of the electronic device 100. Additionally, during the hinge operation 610 of the cradle 200, a part of the cradle 200 may rotate based on the protruding part 131.

Figure 6B:
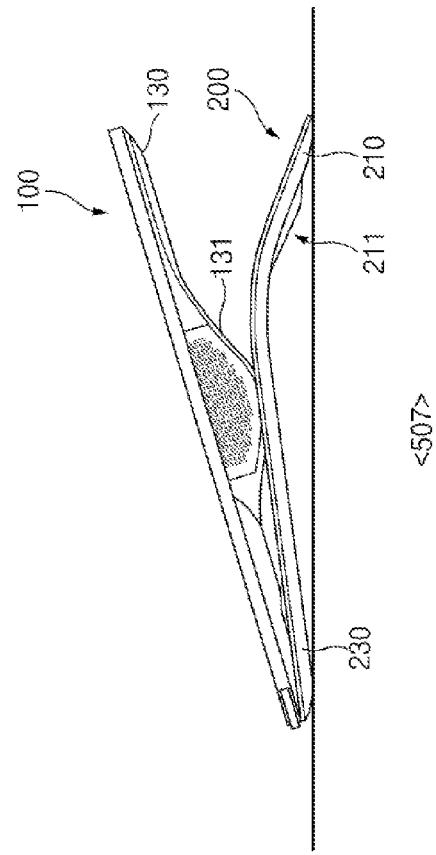
FIG. 6B is a view illustrating a cradling form of an electronic device depending on a hinge operation of a cradle according to an embodiment of the present disclosure.
Figure 6B:
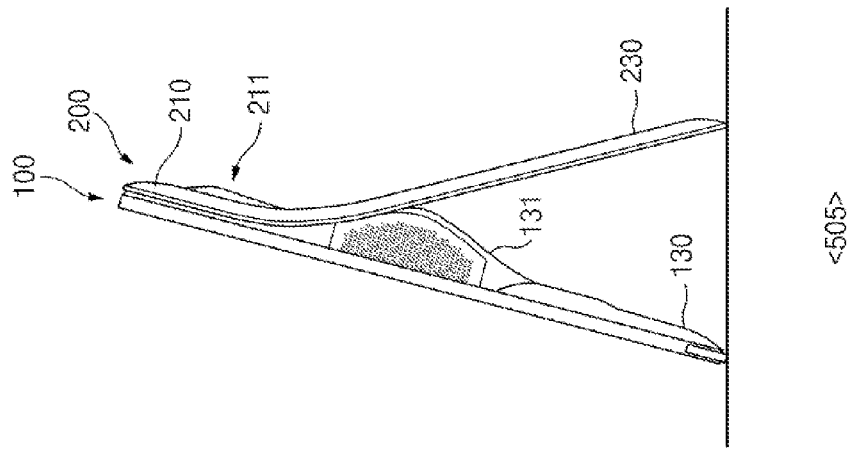

FIG. 6B is a view illustrating a cradling form of an electronic device depending on a hinge operation of a cradle according to an embodiment of the present disclosure.

Referring to FIG. 6B, an electronic device 100 may be cradled with at least one specified angle according to the hinge operation 610 (shown in FIG. 6A) of the cradle 200. According to an embodiment of the present disclosure, as shown in a third state 505, when the first support part 210 of the cradle 200 closely contacts the upper end of the rear surface 130 of the housing 101 of the electronic device 100, the electronic device 100 may be cradled in a first cradling form (for example, a standing mode). In the first cradling form, in relation to the electronic device 100, the lower end of the housing 101 of the electronic device 100 and the lower end of the second support part 230 of the cradle 200 may face the ground. Accordingly, in the first cradling form, the display 1410 disposed at the front surface 110 of the electronic device 100 may form an acute angle close to the right angle (or, an angle of 90 degrees) with the ground. According to another embodiment of the present disclosure, as shown in a fourth state 507, when the second support part 230 of the cradle 200 closely contacts the lower end of the rear surface 130 of the housing 101 of the electronic device 100, the electronic device 100 may be cradled in a second cradling form (for example, a typing mode). In the second cradling form, in relation to the electronic device 100, the upper end of the first support part 210 and the lower end of the second support part 230 of the cradle 200 may face the ground. Accordingly, in the second cradling form, the display 1410 disposed at the front surface 110 of the electronic device 100 may form an acute angle close to the parallel with the ground.

Figure 7A:
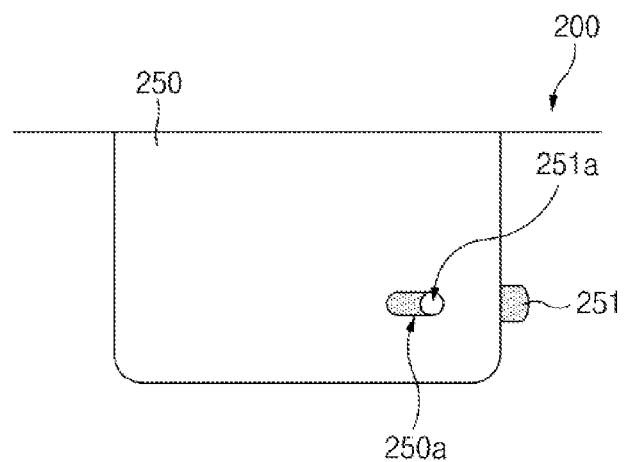
FIG. 7A is a front view illustrating a coupling part of a cradle according to an embodiment of the present disclosure.
Figure 7B:
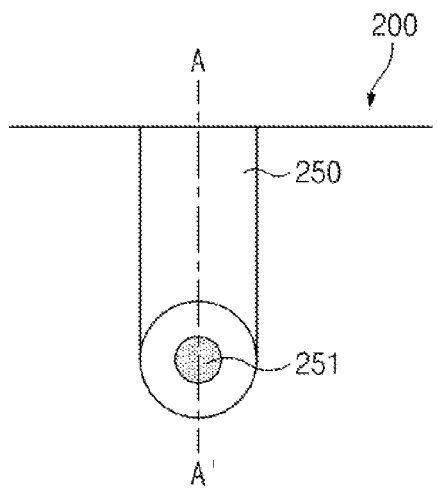
FIG. 7B is a side view illustrating the coupling part of FIG. 7A according to an embodiment of the present disclosure.

FIG. 7A is a front view illustrating a coupling part of a cradle according to an embodiment of the present disclosure; FIG. 7B is a side view illustrating the coupling part of FIG. 7A according to an embodiment of the present disclosure; and FIG. 7C is a sectional view taken along a line A-A' of FIG. 7B according to an embodiment of the present disclosure.

Figure 7C:
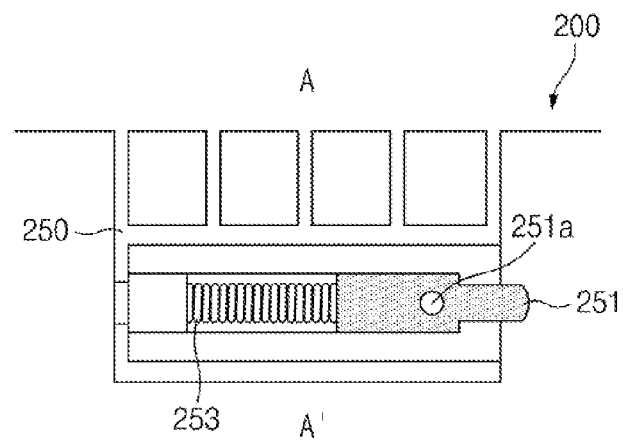
FIG. 7C is a sectional view taken along a line A-A' of FIG. 7B according to an embodiment of the present disclosure.

Referring to FIGS. 7A to 7C, at least one coupling part 250 of the cradle 200 may be formed in a partial area of the main body of the cradle 200. The coupling part 250 may be formed to have a specified width and length in the main body rear surface direction of the cradle 200. The width and length of the coupling part 250 may correspond to the width and depth of the recess part 133 formed at the rear surface 130 of the housing 101 of the electronic device 100. Additionally, in order to allow one end of the coupling part 250 fastened to the recess part 133 to be smoothly inserted into the recess part 133, a part of the edge may be formed in a curved form.

According to various embodiments of the present disclosure, the coupling part 250 may include a center axis 251 and an elastic member 253 at the inner side. When the coupling part 250 is fastened to the recess part 133 formed at the rear surface 130 of the housing 101 of the electronic device 100, the center axis 251 may serve as a rotation axis to allow the cradle 200 to be rotatable (or hingeable). According to various embodiments of the present disclosure, the center axis 251 may be fastened to a fastening part (for example, a fastening hole) formed at a part of the sidewall of the recess part 133. For example, a part of the center axis 251 may protrude from one side (for example, a side) of the coupling part 250 and may be inserted and fastened to a fastening hole of the recess part 133.

The elastic member 253 may function to allow the center axis 251 to be movable in a specified direction (for example, a side direction of the coupling part 250). The elastic member 253 may be deformed by an elastic force applied in a specified direction. For example, according to the size of an elastic force, the elastic member 253 may be deformed through a length change within a specified range. According to an embodiment of the present disclosure, when no external force is applied to the elastic member 253, the elastic member 253 may maintain a first form having a first length. In this case, by the elastic member 253 of the first length, at least a part of the center axis 251 may protrude to the outside of the coupling part 250. Additionally, when a specified size of external force is applied to the elastic member 253, the elastic member 253 may be deformed in a second form of a second length (for example, a length having relatively smaller size than the first length). In this case, by the elastic member 253 of the second length, at least a part of the center axis 251 protruding to the outside of the coupling part 250 may be moved to the inner side of the coupling part 250.

According to various embodiments of the present disclosure, a separation hole 251*a* (or an ejection hole) may be formed at a part (for example, a side) of the center axis 251. The separation hole 251*a* may be formed with a specified width and depth from one side of the center axis 251. According to an embodiment of the present disclosure, the width and depth of the separation hole 251*a* may be formed with a specified size to allow a part of a specific object (for example, a separation stick) to be inserted.

According to various embodiments of the present disclosure, the coupling part 250 may include an opening part 250*a* at one side (for example, the front surface). The opening part 250*a* may be formed as aligned to the separation hole 251 of the center axis 251 disposed at the inner side of the coupling part 250. Alternatively, the opening part 250*a* may be formed with a width corresponding to a movable distance at the inner side of the coupling part 250. Accordingly, even if the center axis 251 is moved by the elastic member 253, the separation hole 251*a* formed at the center axis 251 may be exposed to the outside through the opening part 250*a* formed at the coupling part 250.

Figure 8A:
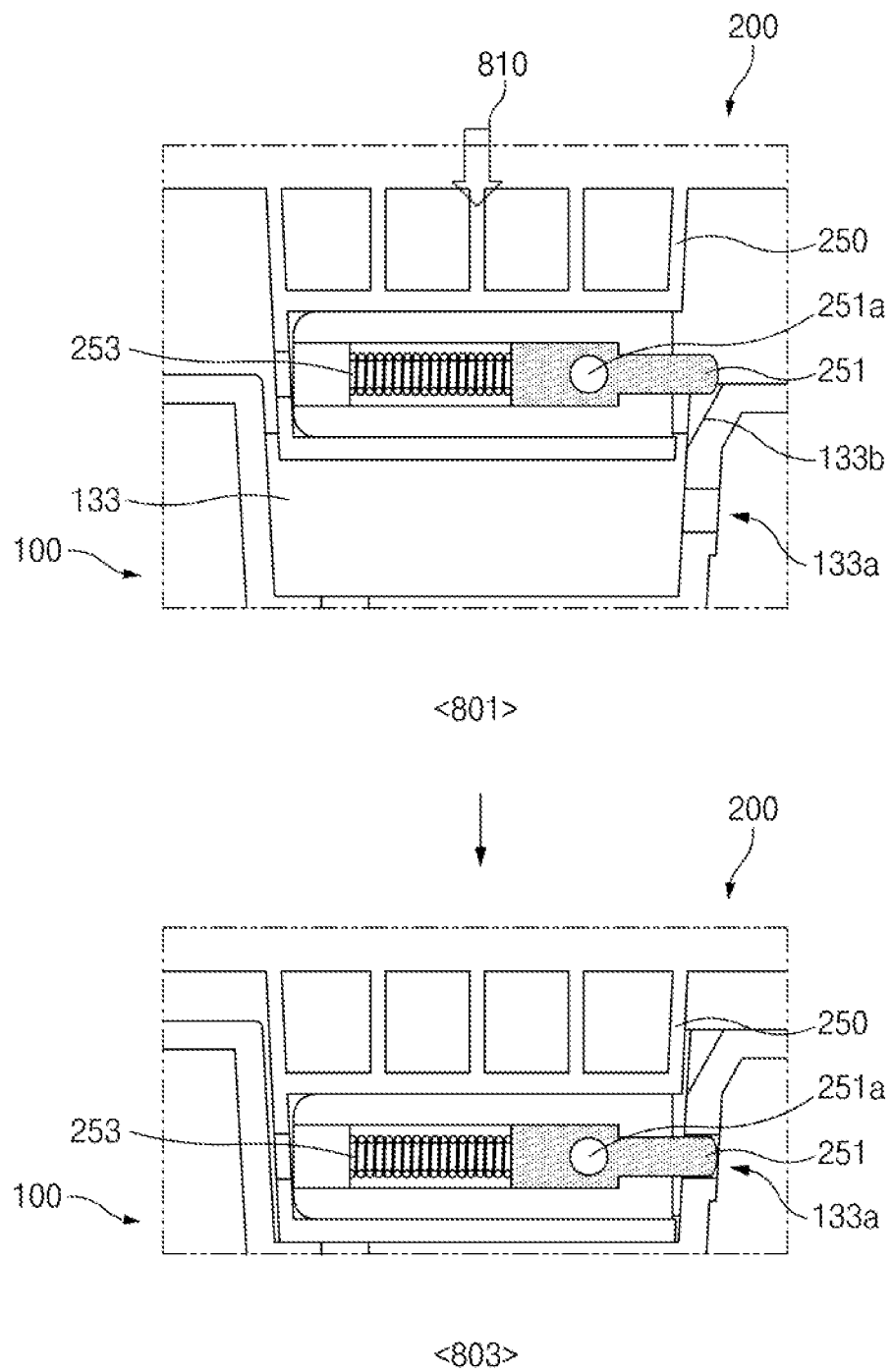
FIG. 8A is a sectional view illustrating a coupling part for coupling a cradle to an electronic device according to an embodiment of the present disclosure.

FIG. 8A is a sectional view illustrating a coupling part for coupling a cradle to an electronic device according to an embodiment of the present disclosure.

Referring to FIG. 8A, the coupling part 250 of the cradle 200 may be inserted and fastened to the recess part 133 formed at the rear surface 130 of the housing 101 of the electronic device 100. As shown in a first state 801, the coupling part 250 may be inserted and fastened to the recess part 133 through a press filling operation 810 that applies a specified size of force from the upper end of the coupling part 250 to the lower end direction.

According to various embodiments of the present disclosure, the recess part 133 may include a fastening part that functions to allow the coupling part 250 to be fastened. For example, at least one fastening hole 133*a* may be formed at a part of the sidewall of the recess part 133. When the coupling part 250 of the cradle 200 is inserted into the recess part 133 formed at the rear surface 130 of the housing 101 of the electronic device 100, the fastening hole 133*a* may allow the center axis 251 of the coupling part 250 to be fixed. The fastening hole 133*a*, for example, may be formed with a specified width and depth from the sidewall of the recess part 133, and the width and depth of the fastening hole 133*a* may correspond to a width and length with respect to a part of the center axis 251 protruding to the outside of the coupling part 250. Accordingly, as shown in a second state 803, a part of the center part 251 protruding to the outside of the coupling part 250 may be inserted into the fastening hole 133a and fixed.

According to various embodiments of the present disclosure, a part of a sidewall upper end edge of the recess part 133 may include an inclined plane 133b. For example, the inclined plane 133b may be formed by cutting a part of a sidewall upper end edge of the recess part 133 at a predetermined angle. According to an embodiment of the present disclosure, the inclined plane 133b may form a predetermined angle with the sidewall of the recess part 133, so that it allows a part of the center axis 251 protruding to the outside of the coupling part 250 of the cradle 200 to be moved toward the inner side of the coupling part 250 slidably along the inclined plane 133b by the press fitting operation 810. According to various embodiments of the present disclosure, a part of the center axis 251 protruding to the outside of the coupling part 250 may be chamfered, and accordingly, during the press filling operation 810, with a small size of force, it may support a part of the center axis 251 to be moved slidably along the inclined plane 133b without difficulties.

Figure 8B:
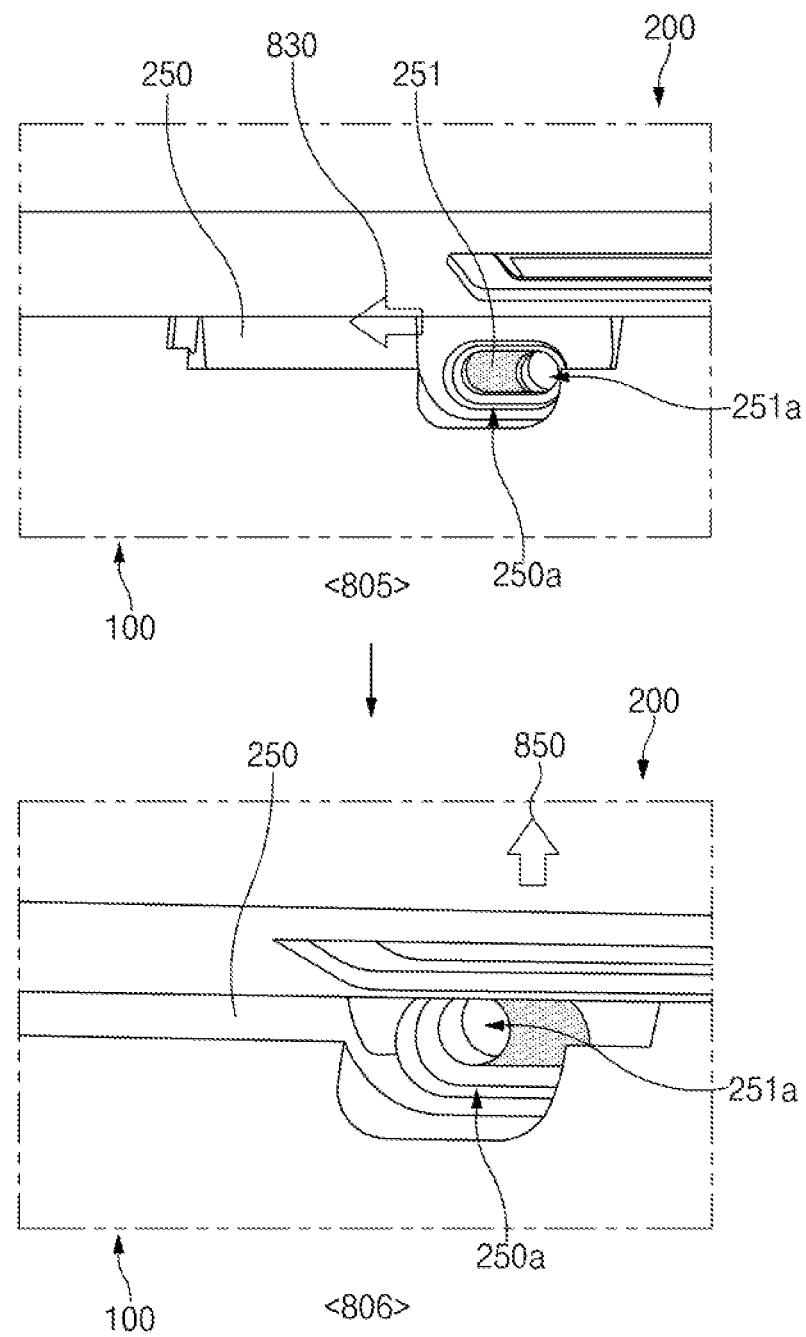
FIG. 8B is a view illustrating a coupling part for separating a cradle from an electronic device according to an embodiment of the present disclosure.
Figure 8C:
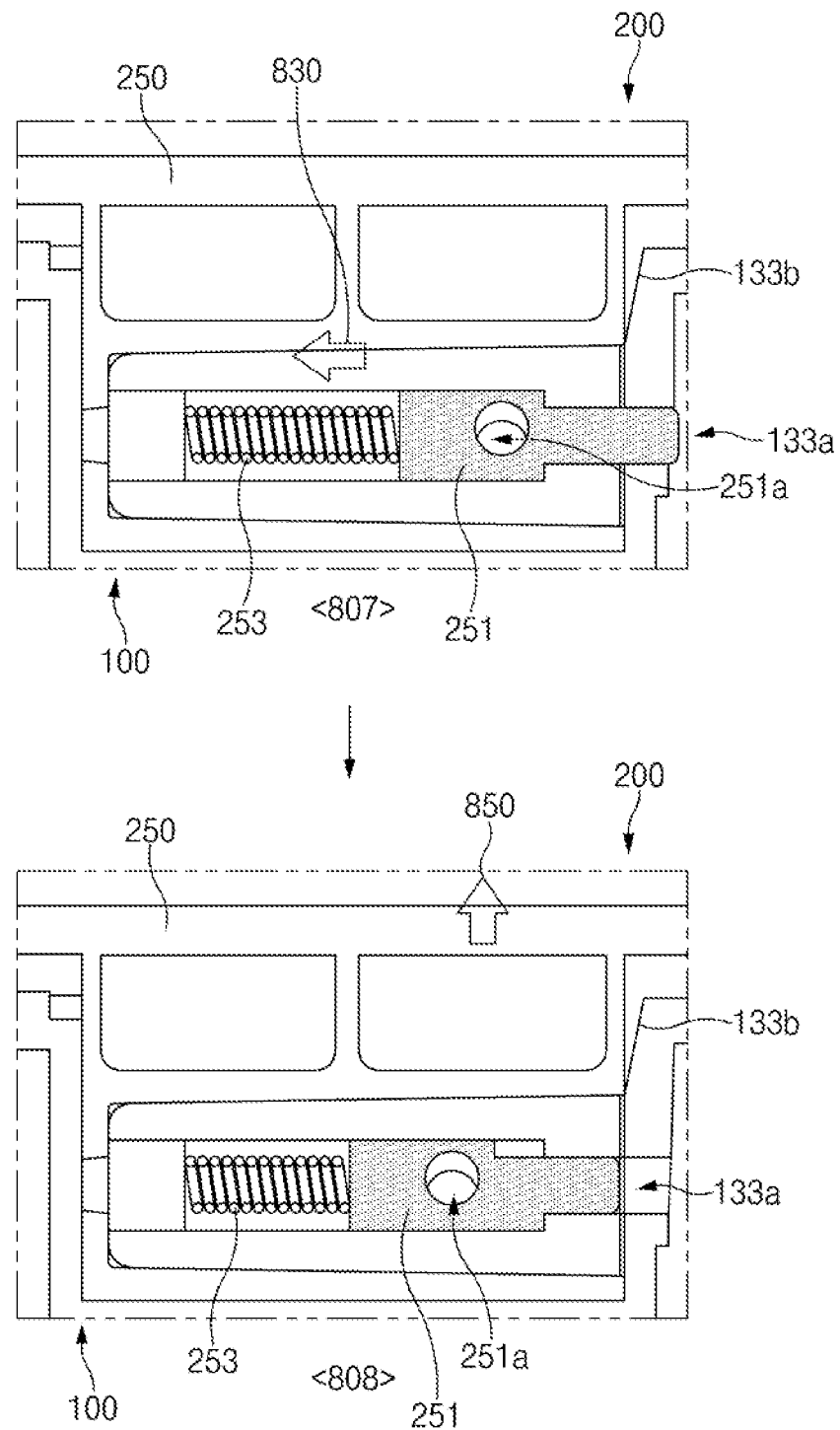
FIG. 8C is a sectional view of the coupling part of FIG. 8B according to an embodiment of the present disclosure.

FIG. 8B is a view illustrating a coupling part for separating a cradle from an electronic device according to an embodiment of the present disclosure, and FIG. 8C is a sectional view of the coupling part of FIG. 8B according to an embodiment of the present disclosure.

Referring to FIGS. 8B and 8C, the coupling part 250 of the cradle 200 may be inserted and fastened to the recess part 133 formed at the rear surface 130 of the housing 101 of the electronic device 100. According to various embodiments of the present disclosure, the separation hole 251a formed at the center axis 251 of the coupling part 250 may be exposed to the outside through the opening part 250a formed at a part of the coupling part 250.

As shown in a third state 805 or in a fifth state 807, when a part of the center part 251 protruding to the outside of the coupling part 250 is fastened to the fastening hole 133a formed at the recess part 133, the center axis 251 may be separated from the fastening hole 133a through a moving operation 830 of a specified direction (for example, a direction from the fastening hole 133a to the coupling part 250). According to various embodiments of the present disclosure, as a specific object (for example, a separation stick) is inserted to the separation hole 251a and moved in a specified direction, the center axis 251 may be moved in a corresponding direction and separated from the fastening hole 133a.

As shown in a fourth state 806, or a six state 808, when the center axis 251 is separated from the fastening hole 133a, the coupling part 250 may be separated from the recess part 133 through an operation 850 for lifting the coupling part 250 in the upper end direction of the recess part 133. When the coupling part 250 is separated from the recess part 133, a part of the center axis 251 may protrude to the outside of the coupling part 250 by a restoring force of the elastic member 253 along the inclined plane 133b formed at a part of the sidewall upper end edge of the recess part 133.

Figure 9:
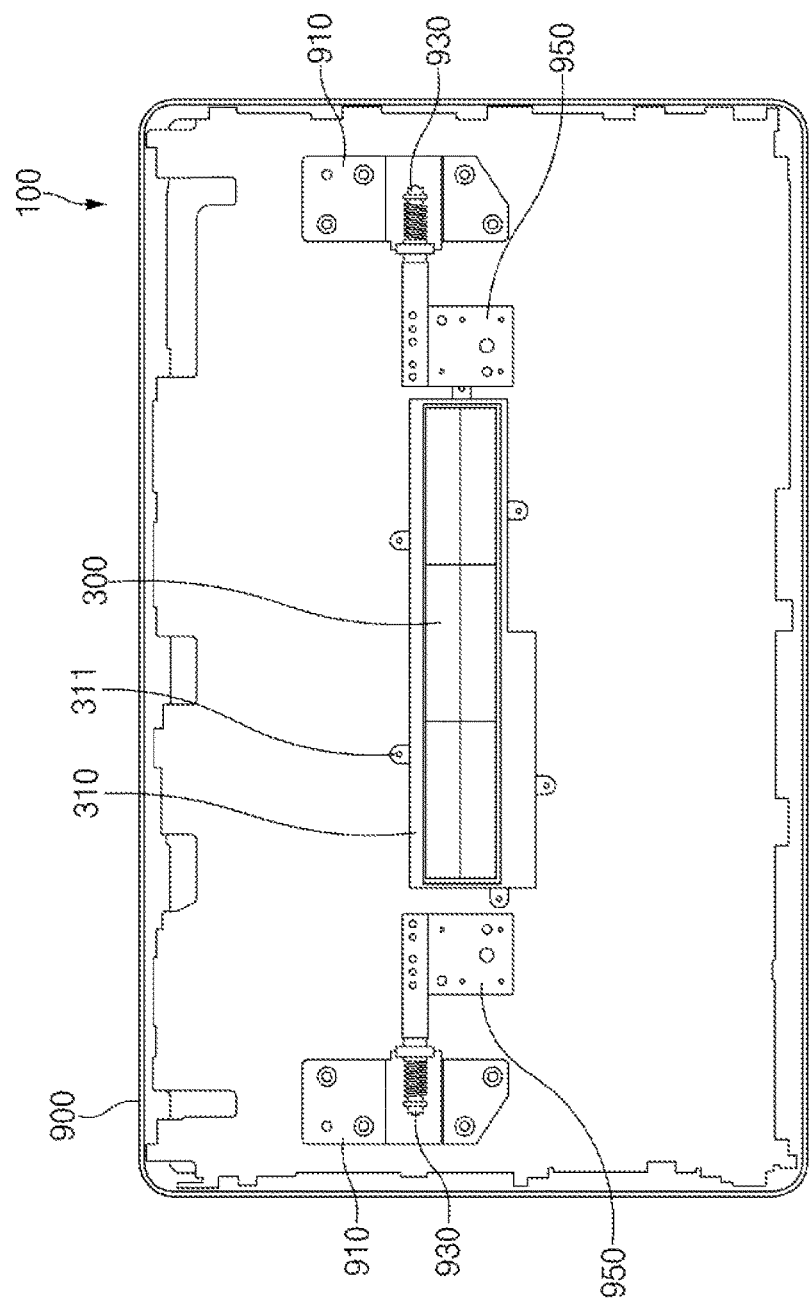
FIG. 9 is a view illustrating a cradle fastening part in a cradle provided with an electronic device integrally according to an embodiment of the present disclosure.

FIG. 9 is a view illustrating a cradle fastening part in a cradle provided with an electronic device integrally according to an embodiment of the present disclosure.

According to various embodiments of the present disclosure, as mentioned above, the cradle 200 may be provided with the electronic device 100 integrally. For example, a main body including a first support part and a second support part of the cradle 200 may be fixed to a cradle fastening part disposed at the inner side of the housing 101 of the electronic device 100 and provided with the electronic device 100 integrally.

Referring to FIG. 9, a cradle fastening part disposed at the inner side of the housing 101 of the electronic device 100 may include a hinge fixing part 910, a hinge axis 930, and a cradle connection part 950. The hinge fixing part 910 may be connected to allow the hinge axis 930 to be rotatable (or hinged) and fixed at the bracket 900. According to an embodiment of the present disclosure, the hinge fixing part 910 may include a hinge part formed with a specified length and width in the rear surface direction of the housing 101 at the bracket 900 in order to allow the hinge axis 930 to be inserted in the length direction of the bracket 900. In relation to the hinge part, a coupling hole may be formed in the length direction of the bracket 900, and the hinge axis 930 may be inserted into the coupling hole and fixed. According to various embodiments of the present disclosure, since an adhesive material is applied to or an adhesive layer is included in at least a partial area, the hinge fixing part 910 may be fixed at the bracket 900. Alternatively, since at least one screw hole is formed in at least a partial area, the hinge fixing part 910 may be fixed at the bracket 900 through a screw.

The hinge axis 930 may be inserted into the coupling hole of the hinge fixing part 910, so that it may be provided in a predetermined form (for example, a cylindrical form) of stick to allow the main body of a cradle to rotate by using the hinge axis 930 as a rotation axis. According to an embodiment of the present disclosure, one end of the hinge axis may be coupled to a separation preventing member (for example, a separation preventing ring) to be inserted into the coupling hole of the hinge fixing part 910. According to an embodiment of the present disclosure, when a screw thread is formed at the hinge axis 930, a nut is coupled to the screw thread to fix the hinge axis 930. Additionally, the other end of the hinge axis 930 may be connected to the cradle connection part 950. According to an embodiment of the present disclosure, the hinge axis 930 may be provided with the cradle connection part 950 integrally.

The cradle connection part 950 may be connected to the main body of the cradle. According to an embodiment of the present disclosure, since an adhesive material is applied to or an adhesive layer is included in at least a partial area, the main body of the cradle may be fixed at the cradle connection part 950. According to an embodiment of the present disclosure, as at least one screw hole is formed in at least a partial area of the cradle connection part 950, the main body of the cradle may be fixed through a screw.

According to various embodiments of the present disclosure, each one of the hinge fixing part 910, the hinge axis 930, and the cradle connection part 950 may be connected to the center area of the bracket 900 or a plurality thereof may be connected to the bracket 900. The drawing shown illustrates that a battery frame 310 where the battery 300 is fastened is fixed by the frame fixing part 311 in the center area of the bracket 900, and each one of the hinge fixing part 910, the hinge axis 930, and the cradle connection part 950 is connected to the bracket 900 at both sides of the battery frame 310 as adjacent to the battery frame 310.

According to various embodiments of the present disclosure, a method of assembling the cradle main body and the electronic device 100 integrally may include coupling the hinge fixing part 910, the hinge axis 930, and the cradle connection part 950 to each other, connecting the cradle 200 to the cradle connection part 950, and connecting the cradle main body to the bracket 900. However, the method of assembling the cradle main body and the electronic device 100 integrally is not limited thereto. According to an embodiment of the present disclosure, the hinge fixing part 910, the hinge axis 930, and the cradle connection part 950 may be first connected to the bracket 900, and the cradle main body may be connected to the cradle connection part 950.

According to various embodiments of the present disclosure, a part of the cradle connection part 950 may be exposed to the rear surface 130 of the housing 101 of the electronic device 100. In this case, the rear surface 130 of the housing 101 may include an opening part to expose a part of the cradle connection part 950 to the outside. According to various embodiments of the present disclosure, the hinge fixing part 910, the hinge axis 930, and the cradle connection part 950 may be connected to the rear surface 130 of the housing 101 of the electronic device 100.

Figure 10:
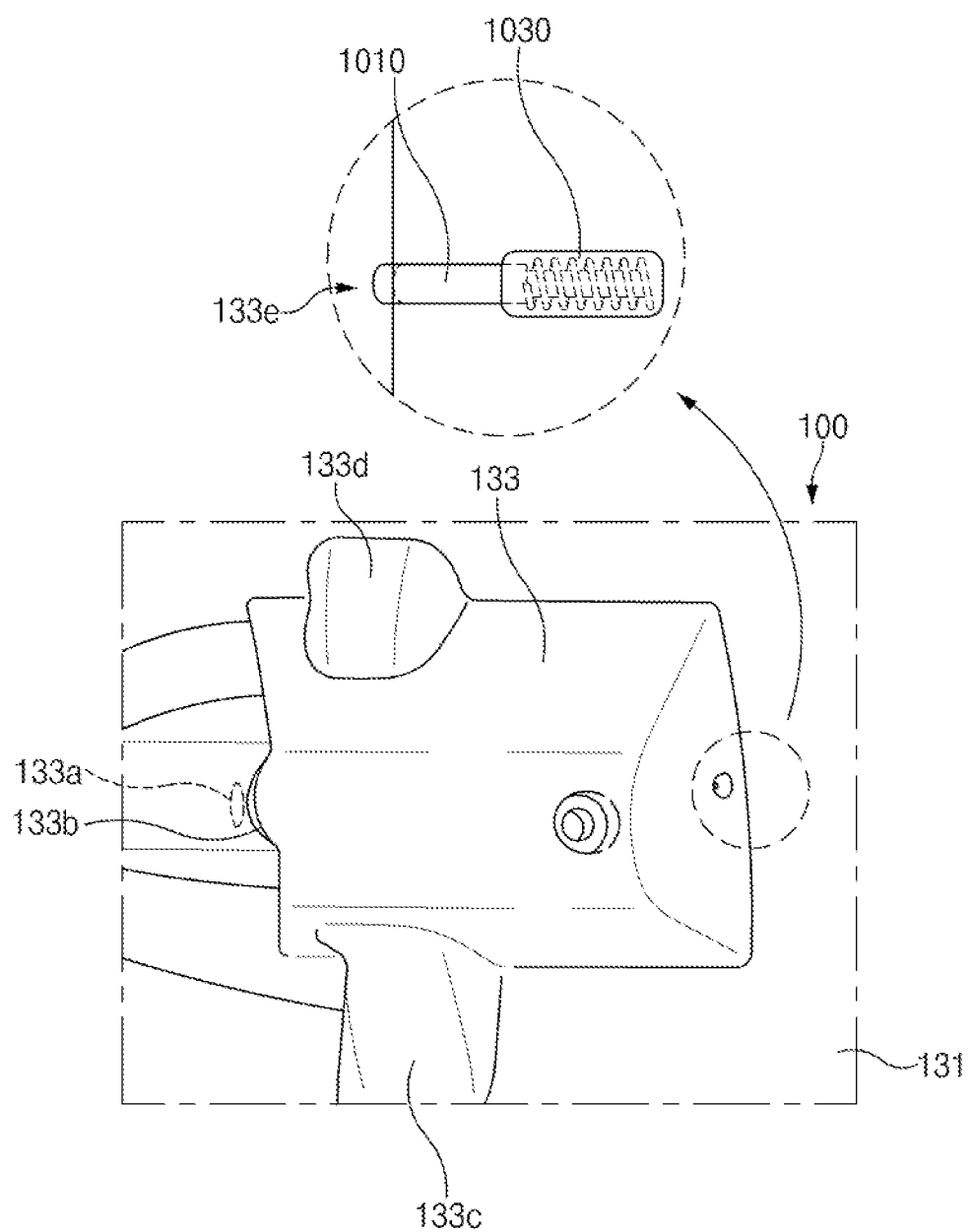
FIG. 10 is a view illustrating a hook part for providing various cradling forms of an electronic device according to an embodiment of the present disclosure.

FIG. 10 is a view illustrating a hook part for providing various cradling forms of an electronic device according to an embodiment of the present disclosure.

According to various embodiments of the present disclosure, the electronic device 100 may be cradled with at least one specified angle by a hinge operation of the cradle 200. According to an embodiment of the present disclosure, when an angle formed by the display 1410 disposed at the front surface 110 of the housing 101 of the electronic device 100 and the ground is set by a rotation angle of the cradle 200, the cradle 200 may fix a cradling form of the electronic device 100 by fixing the rotation angle.

Referring to FIG. 10, a protrusion hole 133e may be formed at a part of a sidewall of the recess part 133 formed at the rear surface 130 of the housing 101 of the electronic device 100. According to an embodiment of the present disclosure, the protrusion hole 133e may be formed at a sidewall facing the sidewall of the recess part 133 where the fastening hole 133a is formed. Additionally, the hook part 1010 (for example, a protrusion) and the elastic member 1030 may be aligned to the protrusion hole 133e and disposed at the sidewall inner side of the recess part 133 where the protrusion hole 133e is formed.

The hook part 1010 may be a predetermined form (for example, a cylindrical form) of stick with a specified width and length, and when one end protruding to the outside through the protrusion hole 133e is fastened to a protrusion groove formed at the cradle 200, in order to allow the cradle 200 to rotate smoothly, a part of the edge may be formed in a chamfered form. According to an embodiment of the present disclosure, the hook part 1010 may be disposed so that at least a part protrudes to the outside through the protrusion hole 133e and is moveable in a specified direction by the elastic member 1030.

The elastic member 1030 may function to allow the hook part 1010 to be movable in a specified direction (for example, a sidewall direction of the recess part 133). The elastic member 1030 may be deformed by an elastic force applied in a specified direction. The elastic member 1030, for example, may include a spring. According to an embodiment of the present disclosure, when no external force is applied to the elastic member 1030, the elastic member 253 may maintain a first form having a first length, so that at least a part of the hook part 1010 may protrude to the outside. Additionally, when a specified size of external force is applied to the elastic member 1030, the elastic member 253 may be deformed in a second form of a second length (for example, a length having relatively smaller size than the first length), so that at least a part of the hook part 1010 protruding to the outside may move to the sidewall inside of the recess part 133.

According to various embodiments of the present disclosure, at least one inclined plane may be formed at a part of the sidewall upper end edge of the recess part 133. The drawing shown illustrates a state in which a first inclined plane 133b, a second inclined plane 133c, and a third inclined plane 133d are formed at the sidewall upper end edge of the recess part 133. As described with reference to FIG. 8A, the first inclined plane 133b may function to allow a part of the center axis 251 protruding to the outside of the coupling part 250 of the cradle 200 to move slidably along the first inclined plane 133b by a press fitting operation.

According to various embodiments of the present disclosure, when the coupling part 250 of the cradle 200 is fastened to the recess part 133, the second inclined plane 133c may provide a space, where a specific object (for example, a separation stick) is inserted and movable, to the separation hole 251a formed at the coupling part 250. According to various embodiments of the present disclosure, when the coupling part 250 of the cradle 200 is fastened to the recess part 133, the third inclined plane 133d may provide a space where a body part (for example, a finger) or a specific object is inserted to lift the coupling part 250 in the upper end direction of the recess part 133.

Figure 11A:
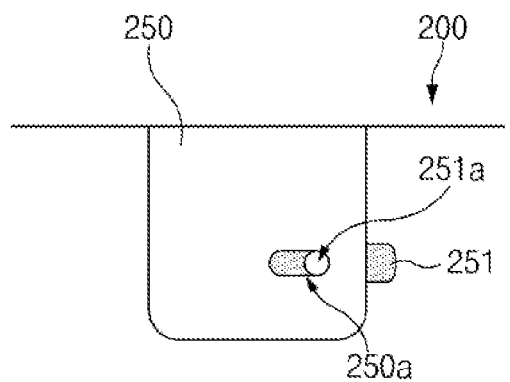
FIG. 11A is a front view illustrating a coupling part of a cradle formed to catch a hook part of an electronic device according to an embodiment of the present disclosure.
Figure 11B:
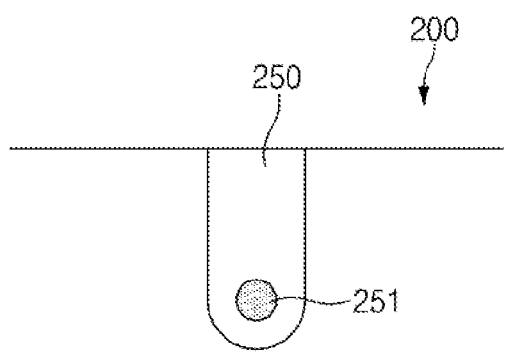
FIG. 11B is one side view illustrating the coupling part of FIG. 11A according to an embodiment of the present disclosure.

FIG. 11A is a front view illustrating a coupling part of a cradle formed to catch a hook part of an electronic device according to an embodiment of the present disclosure; FIG. 11B is one side view illustrating the coupling part of FIG. 11A according to an embodiment of the present disclosure; and FIG. 11C is another side view of the coupling part of FIG. 11A according to an embodiment of the present disclosure.

Figure 11C:
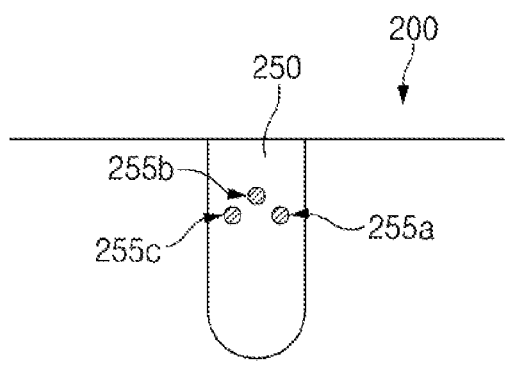
FIG. 11C is another side view of the coupling part of FIG. 11A according to an embodiment of the present disclosure.

Referring to FIGS. 11A to 11C, in relation to the coupling part 250 of the cradle 200, at least one protrusion groove may be formed at the opposite direction side to the side where the center axis 251 protrudes to the outside. The drawing shown illustrates a state in which a first protrusion groove 255a, a second protrusion groove 255b, and a third protrusion groove 255c are formed at the coupling part 250.

The at least one protrusion groove may be formed with a specified width and depth to allow the hook part 1010 protruding from the sidewall of the recess part 133 to be fastened. Additionally, the at least one protrusion groove may be formed at the same or similar separation distance to the center axis 251 of the coupling part 250 to allow the hook part 1010 to be fastened to a different protrusion groove according to a rotation angle of the cradle 200. For example, a separation distance between the rotation axis of the cradle 200 and the first protrusion groove 255a, the second protrusion groove 255b, and the third protrusion groove 255c may be formed identically or similarly.

According to various embodiments of the present disclosure, according to a position of a protrusion groove where the hook part 1010 is fastened, the electronic device 1010 may change its cradling form. For example, when the hook part 1010 is fastened to the first protrusion groove 255a, the electronic device 100 may be cradled in a first cradling form; when the hook part 1010 is fastened to the second protrusion groove 255b, the electronic device 100 may be cradled in a second cradling form; and when the hook part 1010 is fastened to the third protrusion groove 255c, the electronic device 100 may be cradled in a third cradling form.

The drawing shown illustrates a state in which three protrusion grooves are formed at a side of the coupling part 250 but the number and positions of protrusion grooves are not limited thereto. According to various embodiments of the present disclosure, the number of protrusion grooves may correspond to the number of cradling forms of the electronic device 100. For example, as the number of protrusion grooves is increased, the number of cradling forms of the electronic device 100 may be increased, and as the number of protrusion grooves is decreased, the number of cradling forms of the electronic device 100 may be decreased.

Figure 12A:
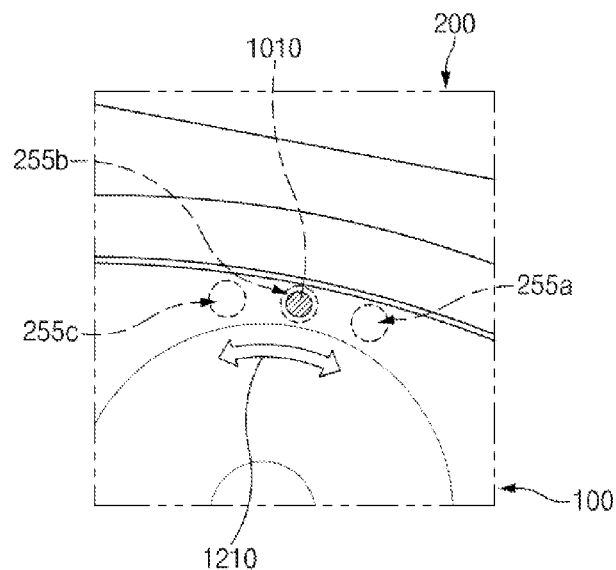
FIG. 12A is a view illustrating a fastening form of a hook part formed at a sidewall of a recess part and at least one protrusion groove formed at a coupling part according to an embodiment of the present disclosure.
Figure 12B:
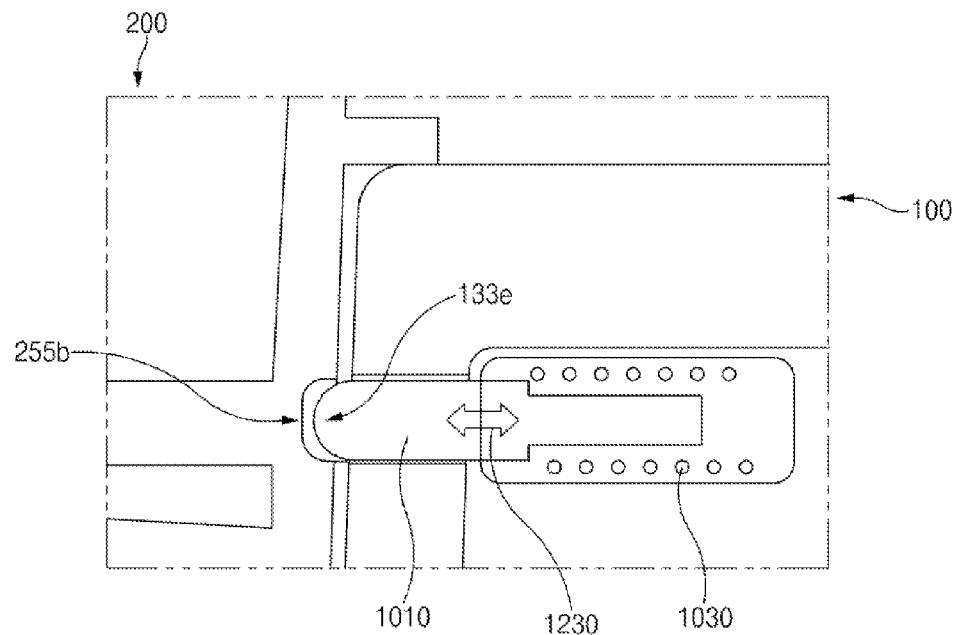
FIG. 12B is a view illustrating a fastening process of a hook part and a protrusion groove according to an embodiment of the present disclosure.

FIGS. 12A and 12B are sectional views illustrating a coupling part for catching a hook part of an electronic device according to an embodiment of the present disclosure. FIG. 12A is a view illustrating a fastening form of a hook part formed at a sidewall of a recess part and at least one protrusion groove formed at a coupling part, and FIG. 12B is a view illustrating a fastening process of a hook part and a protrusion groove.

Referring to FIGS. 12A and 12B, the hook part 1010 formed at the sidewall of the recess part 133 may be fastened to at least one protrusion groove formed at the side of the coupling part 250. The drawing shown illustrates a state in which the hook part 1010 is fastened to the second protrusion groove 255*b*. According to various embodiments of the present disclosure, through a hinge operation 1210 of the cradle 200, the hook part 1010 may be fastened to the first protrusion groove 255*a* or the third protrusion groove 255*c*.

According to various embodiments of the present disclosure, when the hook part 1010 is fastened to at least one protrusion groove, a part of the hook part 1010 protruding to the outside through the protrusion hole 133*e* may be fastened to at least one protrusion groove (for example, the second protrusion groove 255*b*) formed at the coupling part 250. Additionally, when the cradle 200 rotates by using the center axis 251 as a rotation axis through a hinge operation 1210 of the cradle 200, a part of the hook part 1010 fastened to a protrusion groove may move to the sidewall inside of the recess part 133.

According to various embodiments of the present disclosure, an operation 1230 that the hook part 1010 moves in a specified direction is based on an external force applied to the elastic member 1030 and an elastic force of the elastic member 1030. For example, in a state that a part of the hook part 1010 is fastened to a protrusion groove, if the position of the coupling part 250 is changed by the hinge operation 1210 of the cradle 200, the elastic member 1030 may be deformed as a force for pushing the hook part 1010 is applied in the sidewall inside direction of the recess part 133 by the side of the coupling part 250. Additionally, if a protrusion groove formed at a side of the coupling part 250 is aligned to a position of the hook part 1010 as a position of the coupling part 250 is changed by the hinge operation 1210 of the cradle 200, the elastic member 1030 is deformed by an elastic force (for example, a restoring force), so that a part of the hook part 1010 may protrude to the outside.

Figure 13A:
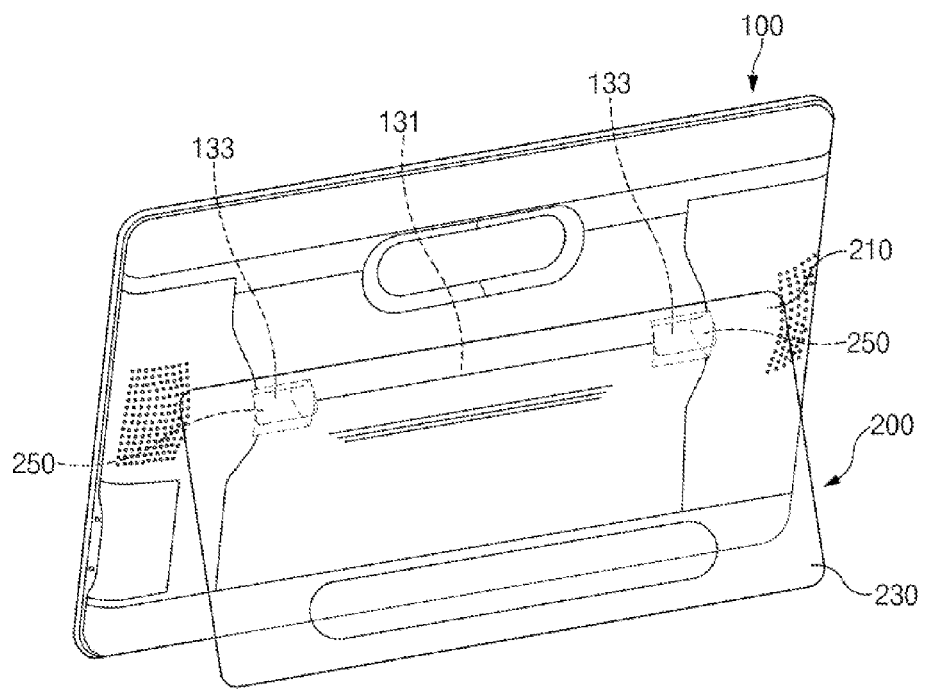
FIG. 13A is a rear perspective view illustrating an electronic device and a cradle provided with the electronic device integrally according to an embodiment of the present disclosure.
Figure 13B:
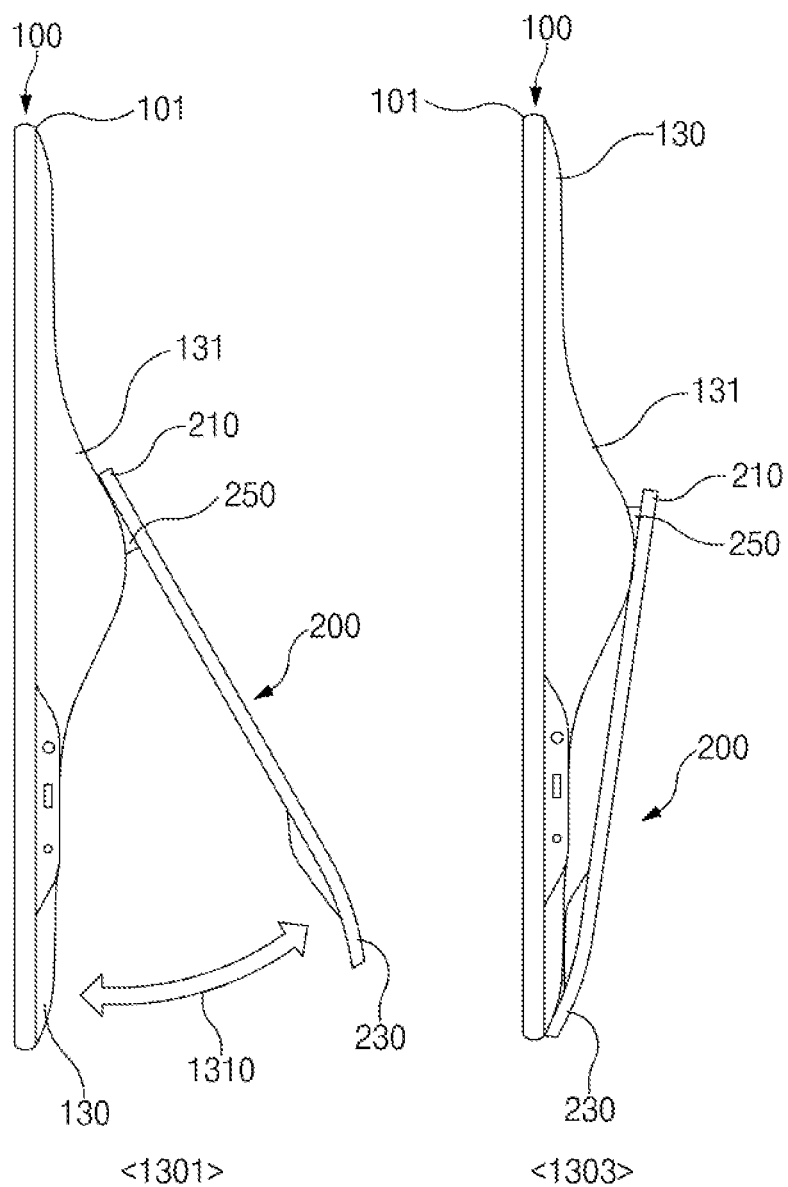
FIG. 13B is a side view illustrating an electronic device and a cradle provided with the electronic device integrally according to an embodiment of the present disclosure.

FIG. 13A is a rear perspective view illustrating an electronic device and a cradle provided with the electronic device integrally according to an embodiment of the present disclosure and FIG. 13B is a side view illustrating an electronic device and a cradle provided with the electronic device integrally according to an embodiment of the present disclosure.

Referring to FIGS. 13A and 13B, the electronic device 100 and the cradle 200 may be provided integrally. According to an embodiment of the present disclosure, when the cradle 200 and the electronic device 100 are provided integrally, the coupling part 250 of the cradle 200 may be fixed at the recess part 133 formed at the rear surface 130 of the housing 101 of the electronic device 100. According to another embodiment of the present disclosure, as described with reference to FIG. 9, the coupling part 250 of the cradle 200 may be fixed at the bracket 900 disposed at the inside of the housing 101 of the electronic device 100. Alternatively, the bracket 900 may include components (for example, the hinge fixing part 910, the hinge axis 930, and the cradle connection part 950) where the main body of the cradle 200 is fixed.

According to various embodiments of the present disclosure, the main body of the cradle 200 may be formed with the same or similar horizontal length and vertical length to the electronic device 100. However, the main body size of the cradle 200 is not limited thereto. As shown in the drawing, the vertical length of the cradle 200 may be formed with a relatively smaller size than the vertical length of the electronic device 100 (for example, a half size or a similar half size).

According to various embodiments of the present disclosure, when the main body size of the cradle 200 is formed with a relatively smaller size than the vertical length of the electronic device 100, the coupling part 250 is formed in the upper end area of the first support part 210 of the cradle 200 or the lower end are of the second support part 230, so that is may be fixed at the recess part 133. The drawing shown illustrates a state in which the coupling part 250 is formed in the upper end area of the first support part 210 of the cradle 200. Accordingly, during a hinge operation 1310 of the cradle 200, the upper end area of the first support part 210 or the lower end of the second support part 230, where the coupling part 250 is formed, may face the protruding part 131 formed at the rear surface 130 of the housing 101 of the electronic device 100.

According to various embodiments of the present disclosure, the coupling part 250 may be formed at the main body upper/lower end (for example, the upper end area of the first support part 210 or the lower end area of the second support part 230). According to various embodiments of the present disclosure, the main body size of the cradle 200 may be formed relatively smaller than the size of the housing 101 of the electronic device 100, and accordingly, when the cradle 200 is fastened to the electronic device 100, the total volume is reduced, so that mobility and portability may be increased.

According to various embodiments of the present disclosure, as shown in a first state 1301, when the second support part 230 is separated from the rear surface 130 of the housing 101 of the electronic device 100 through the hinge operation 1310 of the cradle 200, the lower end of the housing 101 of the electronic device 100 and the lower end of the second support part 230 face the ground, so that the electronic device 100 may be cradled in a first cradling form (for example, a standing mode).

According to various embodiments of the present disclosure, as shown in a second state 1303, when the second support part 230 faces the rear surface 130 of the housing 101 of the electronic device 100 through the hinge operation 1310 of the cradle 200, the upper end of the first support part 210 of the cradle 200 and the lower end of the second support part 230 face the ground, so that the electronic device 100 may be cradled in a second cradling form (for example, a typing mode).

Figure 14:
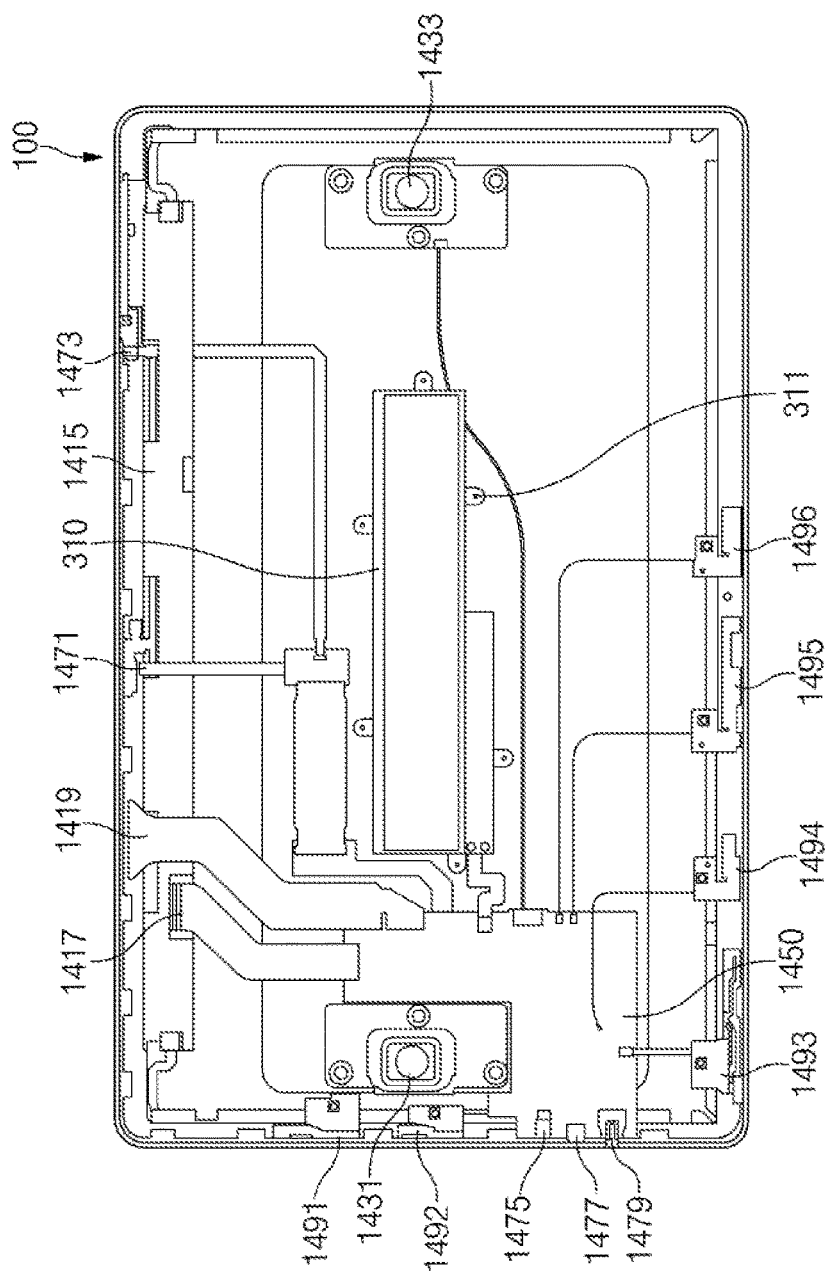
FIG. 14 is a view illustrating an arrangement structure for internal components of an electronic device according to an embodiment of the present disclosure.

FIG. 14 is a view illustrating an arrangement structure for internal components of an electronic device according to an embodiment of the present disclosure.

Referring to FIG. 14, in relation to the electronic device 100, the battery frame 310 fixed by the frame fixing part 311 at the inner side of the housing 101 may be disposed in a specified area (for example, a center area). Additionally, the electronic device 100 may include a display control circuit unit 1415, a display connection part 1417, a touch panel connection part 1419, a first speaker 1431, a second speaker 1433, a control circuit unit 1450, a camera and first microphone 1471, a physical key and second microphone 1473, a first connection part 1475, a second connection part 1477, a third connection part 1479, a first antenna 1491, a second antenna 1492, a third antenna 1493, a fourth antenna 1494, a fifth antenna 1495, and a sixth antenna 1496 inside the housing 101.

The display control circuit unit 1415, for example, may include a driver IC for providing a driving signal and an image signal to the display panel 1413 or a timing controller T-con for controlling display data and data (for example, a driving signal and an image signal) transmitted to the driver IC. The display connection part 1417 may connect the display control circuit unit 1415 and the control circuit unit 1450. The touch panel connection part 1419 may connect a touch panel and the control circuit unit 1450.

The first speaker 1431 and the second speaker 1433 may convert electrical signals delivered from the control circuit unit 1415 into sound and output it. According to various embodiments of the present disclosure, the first speaker 1431 may be disposed at the left border area inside of the protruding part 131 formed at the rear surface 130 of the housing 101 of the electronic device 100 and the second speaker 1433 may be disposed at the right border area inside of the protruding part 131. However, the number and positions of speakers are not limited thereto. According to an embodiment of the present disclosure, the electronic device 100 may include only the first speaker 1431 and the position of the first speaker may be disposed at the lower end right area of the electronic device 100.

The control circuit unit 1450 may include a circuit or an element for controlling at least one component of the electronic device 100. According to an embodiment of the present disclosure, the control circuit unit 1450 may include a processor. The processor may include at least one of a central processing unit (CPU), an application processor (AP), or a communication processor (CP). The processor may perform data processing or an operation related to communication and/or control of at least one of the other elements of the electronic device 100.

In relation to the camera and first microphone 1471, the camera, for example, may capture a still image and a video. According to an embodiment of the present disclosure, the camera may include at least one image sensor, lens, image signal processor (ISP), or flash (for example, LED or xenon lamp). The first microphone may process a sound inputted from the outside. According to an embodiment of the present disclosure, the first microphone may receive sound waves or ultrasonic waves from the outside and generate electrical signals according to the vibration thereof.

In relation to the physical key and second microphone 1473, the physical key, for example, may include a physical button or an optical key. According to an embodiment of the present disclosure, the physical key may be used as a power button, a home button, or an audio volume adjustment button. The second microphone may perform the same or similar function to the first microphone.

The first connection part 1475, the second connection 1477, and the third connection part 1479 may provide an interface for connection with an external device. The connection interface may include a high-definition multimedia interface (HDMI), a universal serial bus (USB) 2074, an optical interface, or a D-subminiature (D-sub). According to an embodiment of the present disclosure, an ear jack may be connected to the first connection part 1475, a USB connector may be connected to the second connection part 1477, and a direct current (DC) jack may be connected to the third connection part 1479.

The first antenna 1491, the second antenna 1492, the third antenna 1493, the fourth antenna 1494, the fifth antenna 1495, and the sixth antenna 1496, as a device for transmitting or receiving electromagnetic energy mainly through a space in order to transmit/receive data, may convert electromagnetic energy received from the outside into electrical energy and convert the electrical energy into electromagnetic energy to transmit it to the outside. According to various embodiments of the present disclosure, the first antenna 1491, the second antenna 1492, the third antenna 1493, the fourth antenna 1494, the fifth antenna 1495, and the sixth antenna 1496 may process different frequency bands of signals.

According to various embodiments of the present disclosure, in relation to the electronic device 100, at least one of the components may be omitted or at least another component may be additionally included.

Figure 15A:
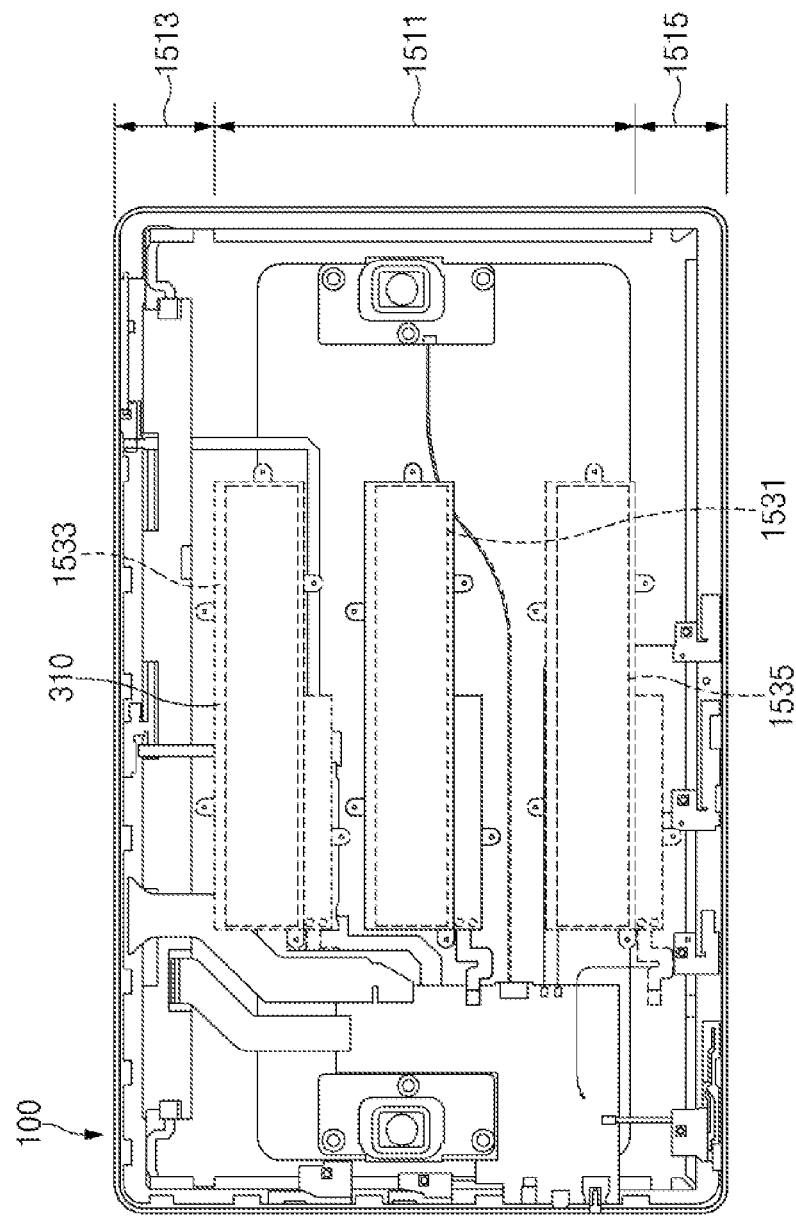
FIG. 15A is a view illustrating an arrangement structure for an internal component of an electronic device depending on an arrangement position of a battery according to an embodiment of the present disclosure.
Figure 15B:
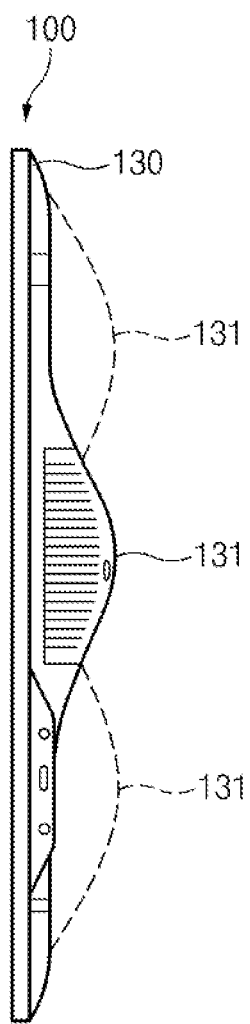
FIG. 15B is a view illustrating a form in which a part of a housing of an electronic device protrudes depending on an arrangement position of a battery according to an embodiment of the present disclosure.

FIG. 15A is a view illustrating an arrangement structure for an internal component of an electronic device depending on an arrangement position of a battery according to an embodiment of the present disclosure and FIG. 15B is a view illustrating a form in which a part of a housing of an electronic device protrudes depending on an arrangement position of a battery according to an embodiment of the present disclosure.

Referring to FIGS. 15A and 15B, the battery 300 may be fastened to the battery frame 310 disposed at the inner side of the housing 101 of the electronic device 100. According to various embodiments of the present disclosure, since the battery frame 310 occupies a relatively larger area than other components in the electronic device 10, it may be disposed in consideration of the arrangement positions of other components. According to an embodiment of the present disclosure, the battery frame 310 may be disposed within a specified range in a vertical direction, including the center part of the electronic device 100. For example, the battery frame 310 may be disposed at the center part 1511 other than the upper end part 1513 and the lower end part 1515 of the electronic device 100 in order to obtain a separation distance from components (for example, the display control circuit unit 1415, the display connection part 1417, or the touch panel connection part 1419 shown in FIG. 14) disposed at the upper end part 1513 of the electronic device 100 or obtain a separation distance from components (for example, the third antenna 1493, the fourth antenna 1494, the fifth antenna 1495, and the sixth antenna 1496) disposed at the lower end part 1515. As shown in FIG. 15A, the battery frame 310 may be disposed in a center area 1531, an upper end area 1533, or a lower end area 1535 of the center part 1511.

According to various embodiments of the present disclosure, the vertical length of the upper end part 1513 may be formed with a specified ratio (for example, 15%) of the entire vertical length of the electronic device 100, and the vertical length of the lower end part 1515 may be formed with a specified ratio (for example, 15%) of the entire vertical length of the electronic device 100.

According to various embodiments of the present disclosure, according to the arrangement position of the battery frame 310, the position of the protruding part 131 formed at the rear surface 130 of the housing 101 of the electronic device 100 may be formed differently. As shown in FIG.

15B, when the battery frame 310 is disposed in the upper end area 1533 of the center part 1511 of the electronic device 100, the protruding part 131 may be formed at the upper end of the rear surface 130. Alternatively, when the battery frame 310 is disposed in the lower end area 1535 of the center part 1511 of the electronic device 100, the protruding part 131 may be formed at the lower end of the rear surface 130.

Figure 15C:
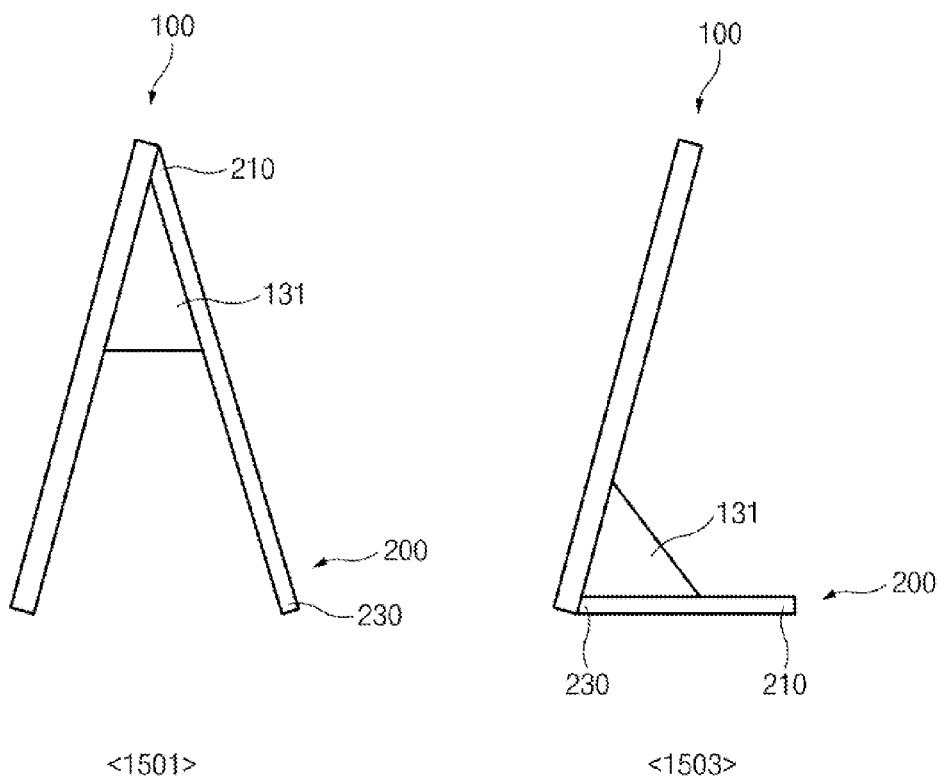
FIG. 15C is a view illustrating a fastening form of a cradle depending on a protruding position of a part of a housing according to an embodiment of the present disclosure.
Figure 15D:
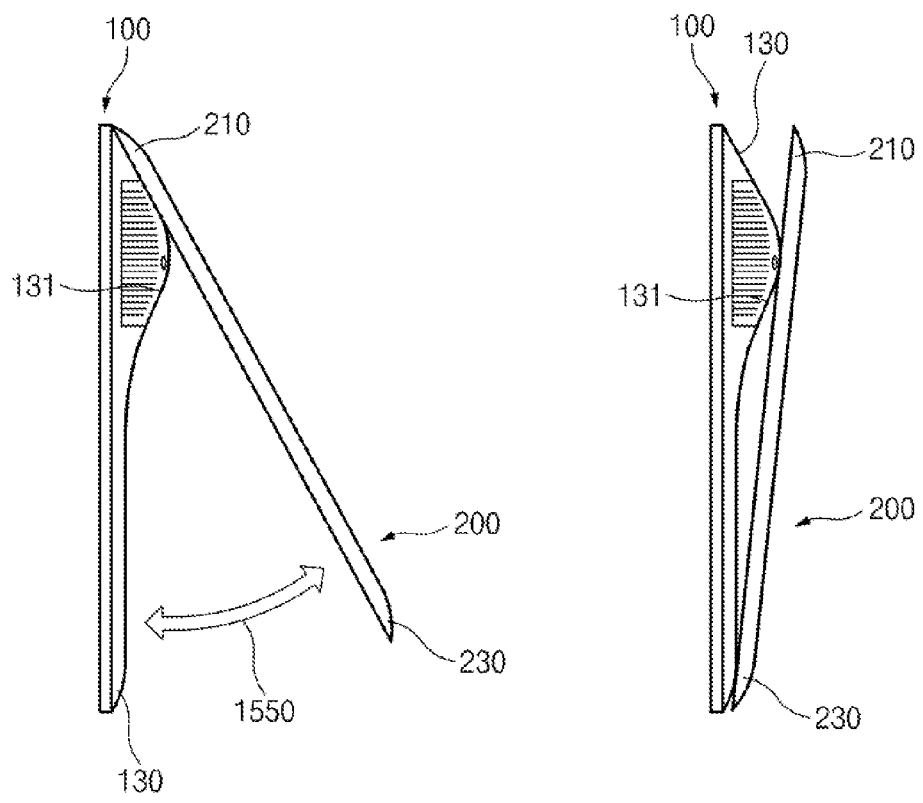
FIG. 15D is a view illustrating a fastening form of a cradle in a form that a rear surface upper part of a housing protrudes according to an embodiment of the present disclosure.

FIG. 15C is a view illustrating a fastening form of a cradle depending on a protruding position of a part of a housing according to an embodiment of the present disclosure; FIG. 15D is a view illustrating a fastening form of a cradle in a form that a rear surface upper part of a housing protrudes according to an embodiment of the present disclosure; and FIG. 15E is a view illustrating a cradling form of an electronic device in a form that a rear surface lower part of a housing protrudes according to an embodiment of the present disclosure.

Figure 15E:
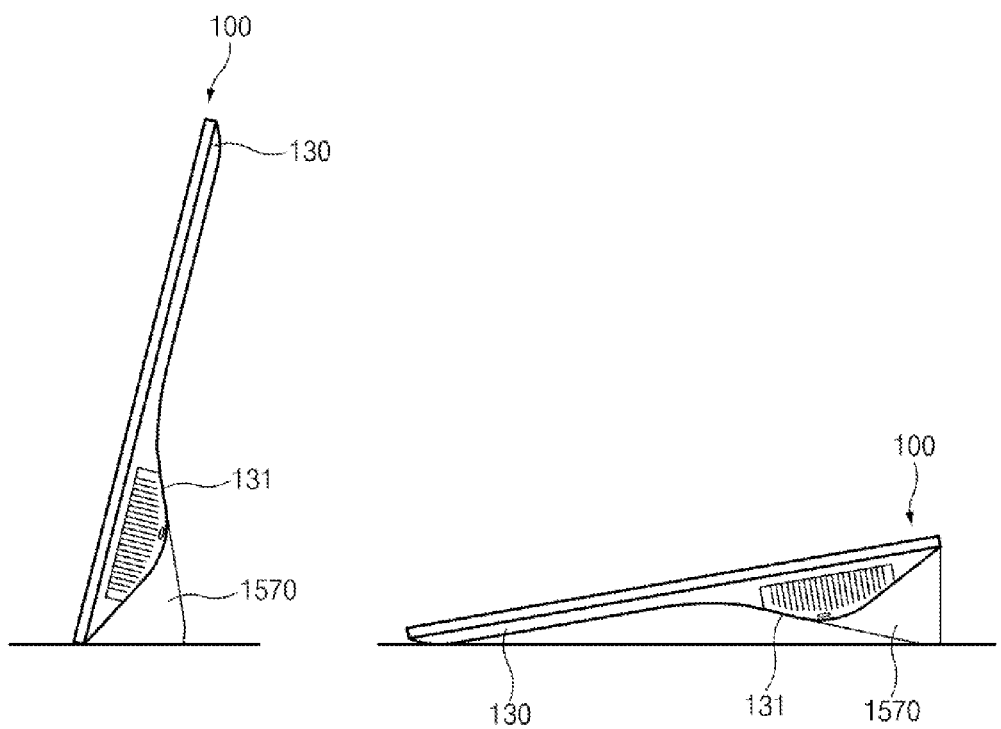
FIG. 15E is a view illustrating a cradling form of an electronic device in a form that a rear surface lower part of a housing protrudes according to an embodiment of the present disclosure.

Referring to FIGS. 15C to 15E, according to the position of the protruding part 131 formed at the rear surface 130 of the housing 101 of the electronic device 100, the fastening form of the cradle 200 may vary. According to various embodiments of the present disclosure, as shown in a first state 1501, when the protruding part 131 is formed at the upper end of the rear surface 130, the cradle 200 may be fastened to the recess part 133 formed at a part of the protruding part 131, and the first support part 210 of the cradle 200 may face the upper end edge of the rear surface 130 of the housing 101. For example, the rear surface 130 of the housing 101 and the cradle 200 may be fastened to each other in a V-shaped form that is bent at the upper end edge of the rear surface 130 of the housing 101. According to an embodiment of the present disclosure, when the cradle 200 and the electronic device 100 are provided integrally, instead of being fastening to the recess part 133 formed at a part of the protruding part 131, the cradle 200 is fastened to the upper end edge of the rear surface 130 of the housing 101, so that it may be provided in a form extending from the upper end edge of the rear surface 130 of the housing 101.

According to various embodiments of the present disclosure, through a hinge operation 1550 of the cradle 200, the second support part 230 of the cradle 200 faces the lower end of the rear surface 130 of the housing 101, so that a cradling form of the electronic device 100 may be changed. For example, as shown in a third state 1505, when the first support part 210 of the cradle 200 faces the upper end edge of the rear surface 130 of the housing 101, the lower end of the second support part 230 of the cradle 200 and the lower end of the housing 101 face the ground, so that the electronic device 100 may be cradled in a first cradling form (for example, a standing mode). Additionally, as shown in a fourth state 1506, when the second support part 230 of the cradle 200 faces the lower end edge of the rear surface 130 of the housing 101, the upper end of the first support part 210 of the cradle 200 and the lower end of the second support part 230 face the ground, so that the electronic device 100 may be cradled in a second cradling form (for example, a typing mode).

According to various embodiments of the present disclosure, as shown in a second state 1503, when the protruding part 131 is formed at the lower end of the rear surface 130, the cradle 200 may be fastened to the recess part 133 formed at a part of the protruding part 131, and the second support part 230 of the cradle 200 may face the lower end edge of the rear surface 130 of the housing 101. For example, the rear surface 130 of the housing 101 and the cradle 200 may be fastened to each other in a V-shaped form that is bent at the lower end edge of the rear surface 130 of the housing 101. According to an embodiment of the present disclosure, when the cradle 200 and the electronic device 100 are provided integrally, instead of being fastening to the recess part 133 formed at a part of the protruding part 131, the cradle 200 is fastened to the lower end edge of the rear surface 130 of the housing 101, so that it may be provided in a form extending from the lower end edge of the rear surface 130 of the housing 101.

According to various embodiments of the present disclosure, when the protruding part 131 is formed at the lower end of the rear surface 130, the main body of the cradle 200 may be formed extending from a curved surface that continues from the center line of the protruding part 131 to the lower end edge of the rear surface 130 of the housing 101. Alternatively, the rear surface 130 of the housing 101 may include an extension part 1570 extending from a part of a curved surface that continues from the center line of the protruding part 131 to the lower end edge of the rear surface 130. In this case, as shown in a fifth state 1507, one surface of the extension part 1570 and the lower end of the housing 101 face the ground, so that the electronic device 100 may be cradled in a first cradling form (for example, a standing mode). Additionally, as shown in a sixth state 1508, the other surface of the extension part 1570 and the upper end of the housing 101 face the ground, so that the electronic device 100 may be cradled in a second cradling form (for example, a typing mode).

Figure 16A:
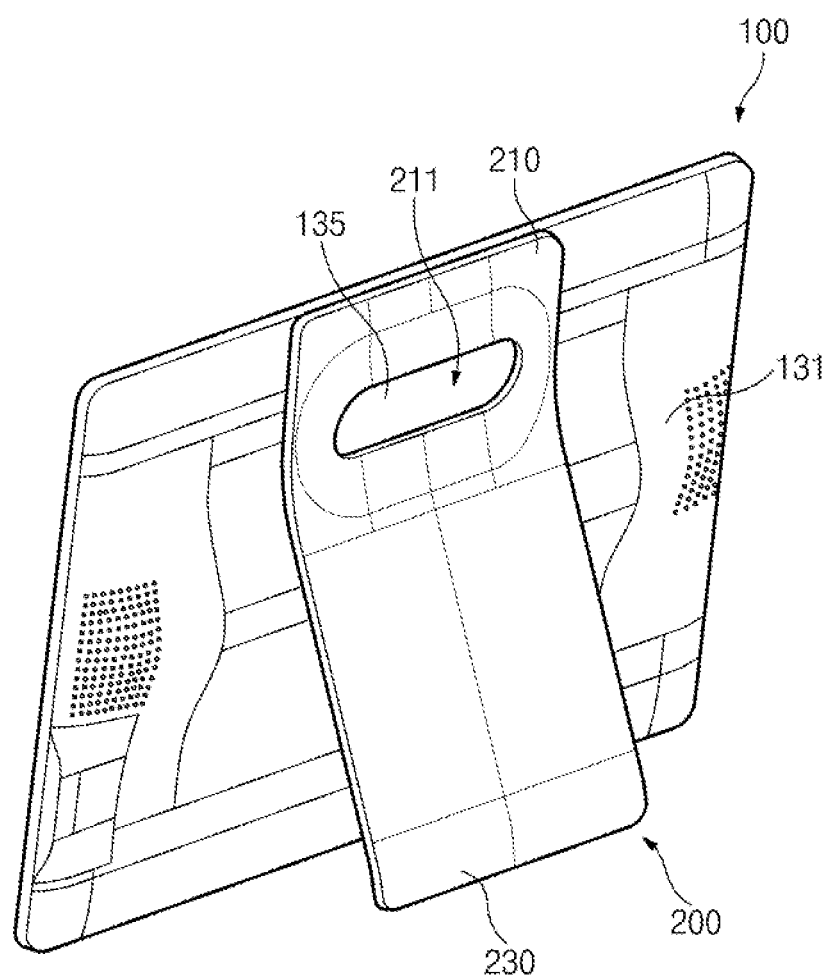
FIG. 16A is a rear perspective view illustrating an electronic device and a cradle in a form that batteries are separately-disposed at the left and right according to an embodiment of the present disclosure.
Figure 16B:
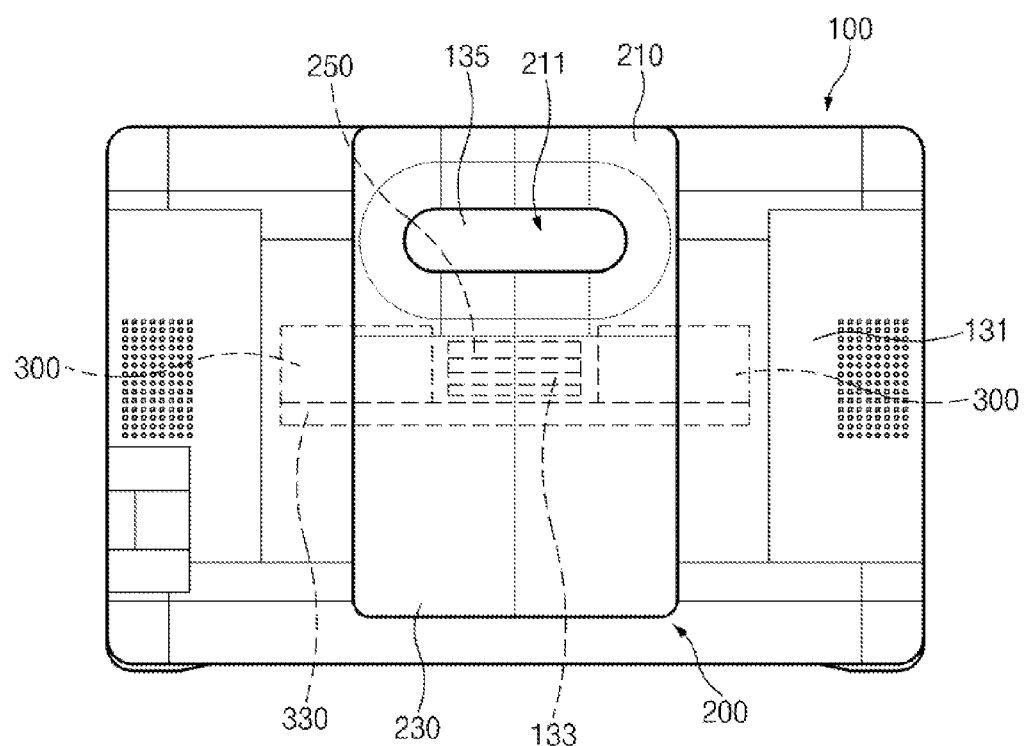
FIG. 16B is a rear view illustrating an electronic device and a cradle in a form that batteries are separately-disposed at the left and right according to an embodiment of the present disclosure.

FIG. 16A is a rear perspective view illustrating an electronic device and a cradle in a form that batteries are separately-disposed at the left and right according to an embodiment of the present disclosure and FIG. 16B is a rear view illustrating an electronic device and a cradle in a form that batteries are separately-disposed at the left and right according to an embodiment of the present disclosure.

Referring to FIGS. 16A and 16B, the electronic device 100 may include a plurality of batteries 300 and at least one battery 300 may be separately-disposed from another battery 300. The drawing shown illustrates a state in which the batteries 300 are separately-disposed at the center left and right of the electronic device 100 and are connected through the electrical connection part 330.

According to various embodiments of the present disclosure, when the batteries 300 are separately disposed, instead that a plurality (for example, two) of recess parts 133 are formed at the rear surface 130 of the housing 101, one recess part 133 may be formed in a space between the separately-disposed batteries 300. However, the number and positions of the recess parts 133 are not limited thereto. According to various embodiments of the present disclosure, each one recess part 133 may be formed at the left and right edges of the batteries 300. Alternatively, each one recess part 133 may be formed in a space between the left and right side edges of the batteries 300 and the batteries 300.

According to various embodiments of the present disclosure, when one recess part 133 is formed in a space between separately-disposed batteries 300, one coupling part 250 of the cradle 200 inserted and fastened to the recess part 133 may be formed. According to an embodiment of the present disclosure, the cradle 200 may include one coupling part 250 in the main body center area of the cradle 200.

According to various embodiments of the present disclosure, when the cradle 200 includes one coupling part 250, the horizontal length of the cradle 200 may be formed with a relatively smaller size than the horizontal length of the electronic device 100. According to an embodiment of the present disclosure, the horizontal length of the cradle 200 may be provided in a size that the opening part 211 is formed. For example, the horizontal length of the cradle 200 may be formed to allow the opening part 211 to be formed with a width corresponding to the cutout part 135 cut out with a specified width and depth in one area of the rear surface 130 of the housing 101. Alternatively, the horizontal length of the cradle 200 may be formed in correspondence to a separation distance of the separately-disposed batteries 300.

Figure 17A:
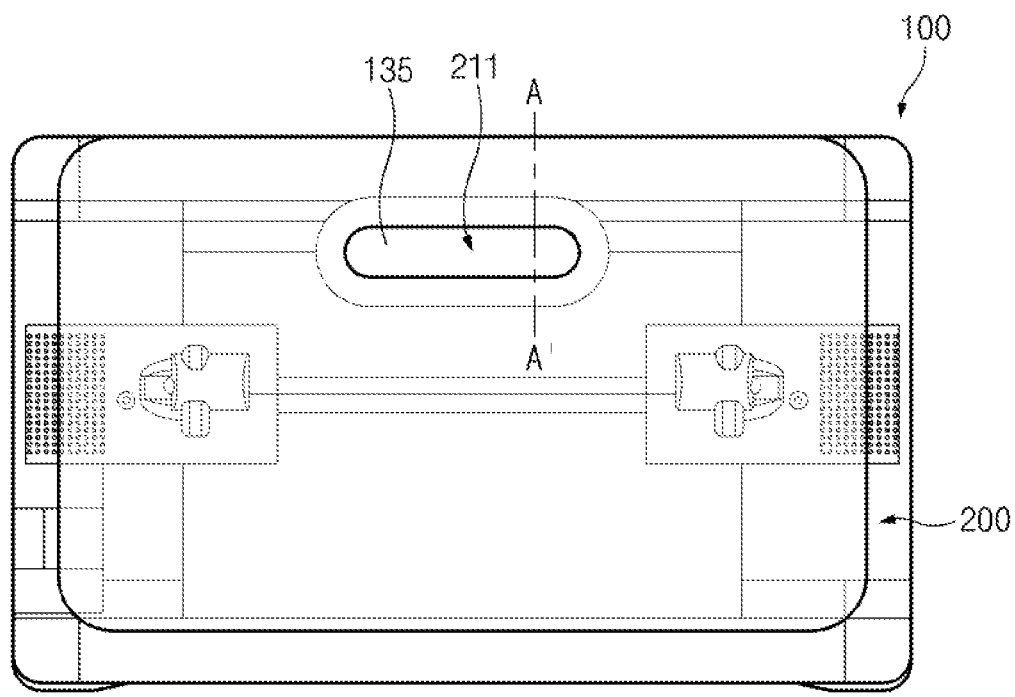
FIG. 17A is a view illustrating a handle form of an electronic device and a cradle according to an embodiment of the present disclosure.
Figure 17B:
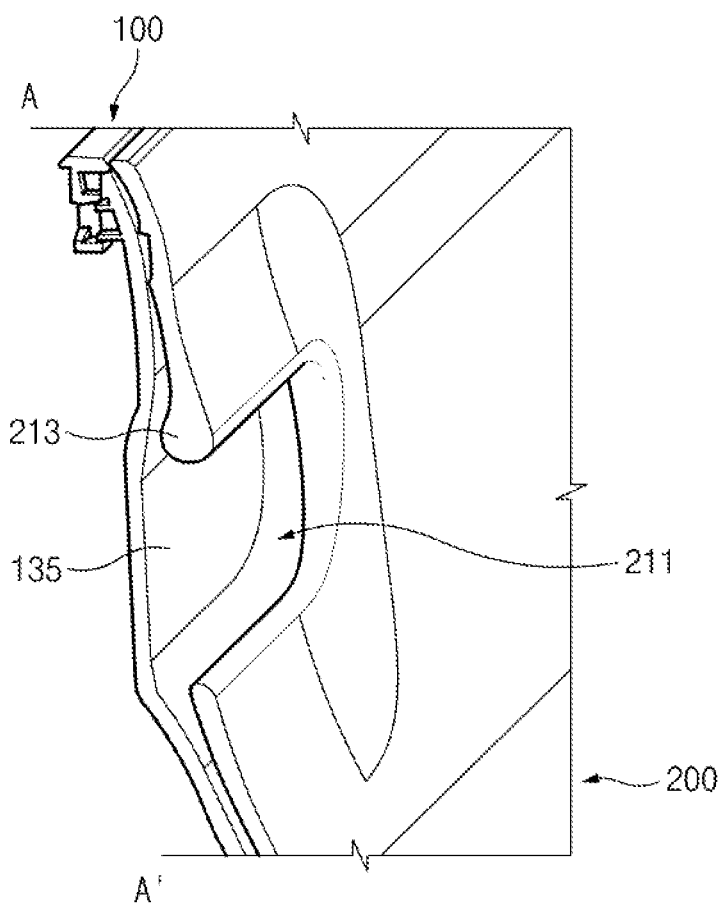
FIG. 17B is a sectional view taken a line A-A' of FIG. 17A according to an embodiment of the present disclosure.

FIG. 17A is a view illustrating a handle form of an electronic device and a cradle according to an embodiment of the present disclosure and FIG. 17B is a sectional view taken a line A-A' of FIG. 17A according to an embodiment of the present disclosure.

Referring to FIGS. 17A and 17B, in relation to the electronic device 100, the cutout part 135 cut out with a specified width and length may be formed in one area (for example, an upper end center area) of the rear surface 130 of the housing 101. The cutout part 135 may be formed in a form recessed in the direction from one side of the rear surface 130 of the housing 101 to the front surface 110 in order to be used as a handle space of the electronic device 100.

According to various embodiments of the present disclosure, when the cradle 200 is fastened to the electronic device 100, the opening part 211 may be formed in a partial area (for example, an upper end center area) in order to allow the cutout part 135 formed at the rear surface 130 of the housing 101 to be exposed to the outside. When the cradle 200 is fastened to the electronic device 100 and a part (for example, the first support part 210) closely contacts the rear surface 130 of the housing 101 of the electronic device 100, the opening part 211 may be aligned to the cutout part 135 formed at the rear surface 130 of the housing 101 and closely contact it.

According to various embodiments of the present disclosure, in relation to the cradle 200, a part of the border area 213 of the opening part 211 may be formed relatively thicker than another area. According to an embodiment of the present disclosure, an upper end area in the border area 213 of the opening part 211 may be formed as protruding by a specified height in the rear surface direction of the cradle 200. Accordingly, an area caught by a finger becomes broader so that it is easier for a user to grip the electronic device 100.

As described above, according to various embodiments, an electronic device may include a housing comprising a first surface configured to face a first direction, a second surface configured to face a second direction opposite to the first direction substantially, wherein the second surface comprises a first part and a second part that protrudes further than the first part, and a side member configured to be a part of the second surface or formed separately and surround a space between the first surface and the second surface, wherein at least one of the first surface and the second surface is formed in a rectangular form substantially, a display configured to be exposed through at least a part of the first surface, a wireless communication circuit disposed at the inner side of the housing, a memory disposed at the inner side of the housing, a processor disposed at the inner side of the housing and electrically connected to at least one of the display, the wireless communication circuit, and the memory, and a battery configured to supply power to at least one of the display, the wireless communication circuit, the memory, and the processor. At least a part of the battery may be disposed in at least a partial space between the second part of the second surface and the first surface.

According to various embodiments, the electronic device may further include a fastening part configured to be formed in a partial area of the second part of the second surface, and a cradle configured to be fastened to the fastening part, wherein the cradle mounts the electronic device with at least one selected angle.

According to various embodiments, the cradle may be provided to be detachable from the fastening part.

According to various embodiments, the battery may include at least one battery cell and the at least one battery cell may be provided in a cylindrical type.

As described above, according to various embodiments, an electronic device may include a housing comprising a first surface, a second surface facing opposite to the first surface, and a side surface that surrounds at least a part of a space between the first surface and the second surface, and a battery disposed at the inner side of the housing. The second surface may include a protruding part configured to form at least a part of the second surface and protrude from one side of the second surface, wherein at least a part of the protruding part forms a specified size of protruding height in a lengthwise direction of the second surface, at least one recess part recessed with a specified width and depth in at least a part of the protruding part, and a fastening part disposed in at least a part of a sidewall of the at least one recess part. The battery may be disposed at the inner side of the protruding part.

According to various embodiments, the protruding part may be formed in a form that the protruding height is gradually reduced in a width direction of the second surface by using a center line of the protruding part as the highest height.

According to various embodiments, the protruding part may be formed in a form that the protruding height is gradually reduced in a border area in a lengthwise direction of the second surface.

According to various embodiments, the electronic device may further include at least one speaker disposed at the inner side of the protruding part, wherein the protruding part may include at least one hole formed to be aligned to a position at which the at least one speaker is disposed.

According to various embodiments, the at least one recess part may include at least one inclined plane formed at a part of upper end edge of a sidewall of the at least one recess part.

According to various embodiments, the at least one recess part may include a protrusion hole in at least a part of a sidewall of the at least one recess part.

According to various embodiments, the electronic device may further include a hook part and an elastic member disposed at inner side of the sidewall where the protrusion hole is formed to be aligned to the protrusion hole, wherein at least a part of the hook part protrudes to the outside through the protrusion hole and is movable in a specified direction by the elastic member.

According to various embodiments, one end of the hook part protruding to the outside through the protrusion hole may be provided in a chamfered cylindrical form.

According to various embodiments, the fastening part may include at least one fastening hole.

According to various embodiments, the second surface may further include a cutout part that forms at least a part of the second surface and is cut out (or engraved) with a specified width and depth.

As described above, according to various embodiments, a cradle detachable from an electronic device may include a main body comprising a first support part having a surface and a second support part formed as extending from one side of the first support part, and at least one coupling part configured to be formed at a part of the main body to be fastened to the electronic device. The at least one coupling part may include an elastic member fixed at an inner side, and a center axis configured to be movable in a specified direction by the elastic member. At least a part of the center axis may be configured to protrude to the outside by the elastic member.

According to various embodiments, based on the center axis of the at least one coupling part, the at least one coupling part is rotatably coupled to a fastening part of the electronic device. The fastening part may be disposed in a recessed part which is formed at a protruding part that protrudes from one side of the electronic device.

According to various embodiments, the at least one coupling part may include at least one protrusion groove formed at a side surface in an opposite direction to a side surface where the center axis protrudes to the outside. The at least one protrusion groove may be configured to allow a hook part protruding from a sidewall of the recessed part to be fastened to a different protrusion groove among the at least one protrusion groove according to a rotation angle of the cradle.

According to various embodiments, the center axis may include a separation hole, where a specified size of object is inserted, configured to allow the center axis to be moved at one side, and the at least one coupling part may include an opening part configured to be formed with a width corresponding to a movable distance of the separation hole to allow the separation hole to be exposed to the outside at one side.

According to various embodiments, the cradle may further include an opening part configured to be formed at a part of the main body to allow a handle area of the electronic device to be exposed to the outside while the cradle is fastened to the electronic device.

As described above, according to various embodiments, an electronic device may include a housing comprising a first surface, a second surface facing opposite to the first surface, and a side surface that surrounds at least a part of a space between the first surface and the second surface, a battery disposed at the inner side of the housing, and a cradle. The housing may include a protruding part configured to form at least a part of the second surface and protrude from one side of the second surface, at least one recess part recessed with a specified width and depth in at least a part of the protruding part, and a fastening part disposed in at least a part of a sidewall of the at least one recess part. At least a part of the protruding part may form a specified size of protruding height in a lengthwise direction of the second surface. The battery may be disposed at the inner side of the protruding part. The cradle may include a main body including a first support part having a surface and a second support part formed extending from one side of the first support part, and at least one coupling part formed at a part of the main body to be rotatably coupled to the fastening part of the housing, and may cradle (or mount) the electronic device with at least one specified angle.

According to embodiments disclosed in this specification, as a form that a part of a housing protrudes is provided, a large capacity battery having a relatively large volume is disposed in a protruding area of the housing, so that a space inside the housing may be efficiently utilized.

Additionally, according to embodiments disclosed in this specification, as a form that only a part of a housing protrudes is provided, an electronic device is provided in a slim form generally.

Additionally, according to embodiments disclosed in this specification, as a cradle detachable from a part of a protruding area of a housing operates by using the protruding area as a rotation axis through a hinge operation, an electronic device may be cradled by using the protruding area of the housing.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions. The computer-readable storage medium may be, for example, a memory.

A computer-readable recording medium may include a hard disk, a floppy disk, a magnetic medium (e.g., a magnetic tape), an optical medium (e.g., compact disk read-only memory (CD-ROM), digital versatile disc (DVD)), a magneto-optical medium (e.g., a floptical disk), or a hardware device (e.g., a ROM, a random-access memory (RAM), a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising: a housing comprising:
   a first surface configured to face a first direction,
   a second surface configured to face a second direction substantially opposite to the first direction, and
   a side member configured to be a part of the second surface or formed separately and surround a space between the first surface and the second surface;

a display configured to be exposed through at least a part of the first surface; a wireless communication circuit disposed at an inner side of the housing;
a memory disposed at the inner side of the housing;
a processor disposed at the inner side of the housing and electrically connected to at least one of the display, the wireless communication circuit, and the memory; a battery configured to supply power to at least one of the display, the wireless communication circuit, the memory, and the processor; a plurality of fastening parts;
and
a cradle configured to be fastened to the plurality of the fastening parts, wherein the second surface comprises a first part and a second part that protrudes further than the first part,
wherein at least one of the first surface and the second surface is substantially formed in a rectangular form,
wherein the battery is disposed between the second part of the second surface and the first surface,
wherein the second part includes a plurality of third parts recessed with a specified width and depth,
wherein the plurality of fastening parts is configured to be formed in the plurality of the third parts,
wherein, when a first support part of the cradle contacts an upper end of the second surface, the first surface forms a first acute angle with a ground surface and stays in a standing mode,
wherein, when a second support part opposite to the first support part contacts an opposite lower end of the second surface, the first surface forms a second acute angle with the ground surface and stays in a typing mode, and
wherein the second acute angle is smaller than the first acute angle.

2. The electronic device of claim 1, wherein the cradle is provided to be detachable from the plurality of the fastening parts.

3. The electronic device of claim 1, wherein the battery comprises at least one battery cell and the at least one battery cell is provided in a cylindrical shape.

4. An electronic device comprising:
a housing comprising a first surface, a second surface facing opposite to the first surface, and a side surface that surrounds at least a part of a space between the first surface and the second surface;
a battery disposed at an inner side of the housing; and a cradle,
wherein the second surface comprises:
a protruding part configured to form at least a part of the second surface and protrude from one side of the second surface,
a plurality of recess parts recessed with a specified width and depth in a plurality of parts of the protruding part, and
a plurality of fastening parts disposed in a plurality of sidewalls of the plurality of the recess parts,
wherein the cradle is configured to be fastened to the plurality of the fastening parts,
wherein at least a part of the protruding part forms a specified size of protruding height in a length direction of the second surface,
wherein the battery is disposed at the inner side of the protruding part, wherein, when a first support part of the cradle contacts an upper end of the second surface, the first surface forms a first acute angle with a ground surface and stays in a standing mode,
wherein, when a second support part opposite to the first support part contacts an opposite lower end of the second surface, the first surface forms a second acute angle with the ground surface and stays in a typing mode, and
wherein the second acute angle is smaller than the first acute angle.

5. The electronic device of claim 4, wherein the protruding part is formed in a form that the protruding height is gradually reduced in a width direction of the second surface by using a center line of the protruding part as the highest height.

6. The electronic device of claim 4, wherein the protruding part is formed in a form that the protruding height is gradually reduced in a border area in a lengthwise direction of the second surface.

7. The electronic device of claim 4, further comprising: at least one speaker disposed at an inner side of the protruding part,
wherein the protruding part comprises at least one hole formed to be aligned to a position at which the at least one speaker is disposed.

8. The electronic device of claim 4, wherein at least one recess part of the plurality of the recess parts comprises at least one inclined plane formed at a part of an upper end edge of a sidewall of the at least one recess part.

9. The electronic device of claim 4,
wherein the second surface further comprises a cutout part that forms at least a part of the second surface, and
wherein the cutout part is cut out with a specified width and depth.

* * * * *